United States Patent
Miyamoto et al.

(10) Patent No.: US 11,294,347 B2
(45) Date of Patent: Apr. 5, 2022

(54) CONTROL DEVICE, ROBOT, AND ROBOT SYSTEM

(71) Applicant: Seiko Epson Corporation, Tokyo (JP)

(72) Inventors: Yoshito Miyamoto, Matsumoto (JP); Tsuguya Kojima, Chino (JP)

(73) Assignee: Seiko Epson Corporation

( * ) Notice: Subject to any disclaimer, the term of this patent is extended or adjusted under 35 U.S.C. 154(b) by 519 days.

(21) Appl. No.: 16/173,404

(22) Filed: Oct. 29, 2018

(65) Prior Publication Data

US 2019/0129374 A1    May 2, 2019

(30) Foreign Application Priority Data

Oct. 31, 2017 (JP) .............................. JP2017-210830

(51) Int. Cl.
| | |
|---|---|
| *B05D 1/26* | (2006.01) |
| *B05D 1/40* | (2006.01) |
| *B25J 9/16* | (2006.01) |
| *G05B 19/401* | (2006.01) |
| *G05B 19/402* | (2006.01) |

(52) U.S. Cl.
CPC ............ *G05B 19/402* (2013.01); *B05D 1/26* (2013.01); *B05D 1/40* (2013.01); *B25J 9/1664* (2013.01); *B25J 9/1669* (2013.01); *B25J 9/1694* (2013.01); *B25J 9/1697* (2013.01); *G05B 19/401* (2013.01); *G05B 2219/37281* (2013.01); *G05B 2219/37425* (2013.01)

(58) Field of Classification Search
CPC ................ G05B 19/401; G05B 19/402; G05B 2219/37281; G05B 2219/37425; B25J 9/1697; B25J 9/1669; B25J 9/1694; B25J 9/1664; B05D 1/40; B05D 1/26
See application file for complete search history.

(56) References Cited

U.S. PATENT DOCUMENTS

| | | | | |
|---|---|---|---|---|
| 5,083,073 | A | * 1/1992 | Kato ...................... | B25J 9/1697 318/568.13 |
| 2005/0015175 | A1 | * 1/2005 | Huang ................... | B33Y 70/00 700/121 |
| 2010/0175759 | A1 | 7/2010 | Ikushima | |
| 2012/0197438 | A1 | * 8/2012 | Ogami ................... | B25J 9/1682 700/258 |
| 2015/0127157 | A1 | * 5/2015 | Matsukuma ........... | B25J 9/1682 700/258 |

(Continued)

FOREIGN PATENT DOCUMENTS

| | | |
|---|---|---|
| EP | 2 202 005 A1 | 6/2010 |
| JP | 2006-315157 A | 11/2006 |

(Continued)

*Primary Examiner* — Stephen Holwerda
(74) *Attorney, Agent, or Firm* — Harness, Dickey & Pierce, P.L.C.

(57) ABSTRACT

A control device includes a processor that is configured to execute computer-executable instructions so as to control an arm included in a robot. The processor is configured to perform work on a target using a tool that performs work on the target. A distance meter measures a measurement value according to a relative distance between a first position of the target and the tool. The first position includes a portion overlapping with the tool when viewed from a direction toward the target from the tool.

12 Claims, 12 Drawing Sheets

(56) References Cited

U.S. PATENT DOCUMENTS

2015/0176956 A1* 6/2015 Pettersson .............. G01B 21/04
                                                    33/503
2017/0314621 A1* 11/2017 Akanuma ........... F16C 33/6614

FOREIGN PATENT DOCUMENTS

| JP | 2009-082859 A | 4/2009 | |
|----|---------------|--------|---|
| JP | 3179725 U | 11/2012 | |
| JP | 2014-082975 A | 5/2014 | |
| JP | 2016-172220 A | 9/2016 | |
| WO | WO-2007-064036 A1 | 6/2007 | |
| WO | WO-2016039436 A1 * | 3/2016 | ........... B05C 5/0216 |

* cited by examiner

CONTROL DEVICE, ROBOT, AND ROBOT SYSTEM

BACKGROUND

1. Technical Field

The present invention relates to a control device, a robot, and a robot system.

2. Related Art

Research and development of technologies for making a robot equipped with a tool performing work on an object perform work using a tool are being conducted.

One example of such a tool is a dispenser that discharges a liquid droplet to an object. In a case where the tool is the dispenser, the robot equipped with the dispenser can perform work of discharging the liquid droplet to the object from a discharge port of the dispenser. For example, the liquid droplet discharge apparatus described in JP-A-2014-082975 is a liquid droplet discharge apparatus that discharges microorganisms onto a medium to separate and/or arrange the microorganisms, and in the liquid droplet discharge apparatus, a liquid in which microorganisms are dispersed is discharged onto the medium from the discharge port of the dispenser. In this case, the liquid droplet discharge apparatus determines a target point on the medium to which the liquid droplet is to be discharged with light received from an opening of an optical fiber for optical measurement, which is an opening attached to the dispenser, and discharges the liquid droplet from the discharge port of the dispenser to the determined target point (see JP-A-2014-082975).

Such a liquid droplet discharge apparatus can move the position of the discharge port of the dispenser along a predetermined trajectory by determining a plurality of target points on the medium in a predetermined order. That is, the liquid droplet discharge apparatus can discharge the liquid droplet to the medium along the trajectory. However, in the liquid droplet discharge apparatus, a distance between a certain target point and a dischargeable point on the medium, which is a distance at the timing when the target point is determined with light received from the opening, is determined according to a structural reason of the liquid droplet discharge apparatus and is not determined based on any reason related to an operation of the liquid droplet discharge apparatus other than the structural reason. The dischargeable point at that timing is a point at which liquid droplets can be discharged from the opening at that timing among points on the medium. For that reason, the liquid droplet discharge apparatus sometimes does not allow the position of the discharge port to move along the trajectory. For example, if the trajectory includes a curved portion or a portion bent at right angles, the liquid droplet discharge apparatus sometimes causes the opening to move to a position where it is difficult for the opening to receive light from the medium by making a certain target point coincident with the dischargeable point. In such a case, it becomes difficult for the liquid droplet discharge apparatus to determine the target point with light received by the opening, and as a result, there is a case that work of discharging liquid droplets along a predetermined trajectory on the medium cannot be performed with high accuracy.

Such a problem is a problem that may occur also in a case where a certain robot, which includes a tool for performing work on a certain target and an optical fiber for light measurement attached to the tool, determines a target point on the target to be worked by the tool with light received from the opening of the optical fiber and performs work on the determined target point by the tool. If the distance at the timing when the target point is determined with light received from the opening, which is the distance between the target point and a workable point on the target, is sufficiently far away, the robot may move the opening to a position where it is difficult for the opening to receive light from the target by making a certain target point coincident with the workable point. In such a case, it is difficult for the robot to determine the target point with light received by the opening, and as a result, work to be performed by the tool along the predetermined trajectory on the target may not be performed with high accuracy.

SUMMARY

An aspect of the invention is directed to a control device which includes a control unit controlling a movable unit included in a robot so as to perform work on a target using a tool that performs work on a target and a measurement unit that measures a measurement value according to a relative distance between a first position of the target and the tool, and in which the first position includes a portion overlapping the tool when viewed from a direction toward the target from the tool.

With this configuration, the control device can cause the robot to accurately perform work to be performed on the target along a predetermined trajectory.

In another aspect of the invention, the control device may be configured such that the tool is a discharge unit including a discharge port which allows a discharge substance to be discharged to the target, and the direction is a discharge direction in which the discharge substance is discharged from the discharge port.

With this configuration, the control device can cause the robot to accurately perform work of discharging the discharge substance to the target along the trajectory, among pieces of work to be performed on the target along a predetermined trajectory.

In another aspect of the invention, the control device may be configured such that the first position is not overlapped with the discharge port when viewed from the discharge direction.

With this configuration, the control device can cause the robot to accurately perform work of discharging the discharge substance to the target along the predetermined trajectory while discharging the discharge substance to the target so that the discharge substance and the first position do not overlap each other.

In another aspect of the invention, the control device may be configured such that the measurement unit includes a light-emitting portion that emits light and a light-receiving portion that receives light, and the discharge port is positioned between the light-emitting portion and the light-receiving portion when viewed from the discharge direction.

With this configuration, the control device can cause the robot to accurately perform work of discharging the discharge substance to the target along the predetermined trajectory, based on a measurement value according to the relative distance between the first position positioned between the light-emitting portion and the light-receiving portion and the discharge unit, when viewed from the discharge direction.

In another aspect of the invention, the control device may be configured such that the control unit controls discharge of the discharge substance by the discharge unit.

With this configuration, the control device can change an amount of the discharge substance discharged from the discharge unit according to movement of the movable unit.

In another aspect of the invention, the control device may be configured such that the tool is a processing unit for processing the target.

With this configuration, the control device can cause the robot to accurately perform work of processing the target along the predetermined trajectory among pieces of work to be performed on the target along the predetermined trajectory.

In another aspect of the invention, the control device may be configured such that the control unit controls the movable unit based on the measurement value while performing work by the tool.

With this configuration, the control device can shorten the time for performing work on the target along the predetermined trajectory.

In another aspect of the invention, the control device may be configured such that the control unit controls the movable unit so that the measurement value is kept constant.

With this configuration, the control device can work on the target along the predetermined trajectory while keeping the relative distance between the first position of the target and the tool constant.

In another aspect of the invention, the control device may be configured such that the control unit corrects a teaching point indicated by teaching point information stored in advance based on an image from an imaging unit capable of imaging the target and controls the movable unit based on the corrected teaching point.

With this configuration, the control device can make the predetermined trajectory coincident with a trajectory along which the tool moves with high accuracy, and as a result, accuracy of the work to be performed by the robot on the target along the predetermined trajectory can be further improved.

In another aspect of the invention, the control device may be configured such that the measurement unit and the tool are provided in the movable unit.

With this configuration, the control device can cause the robot to accurately perform work to be performed on the target along the predetermined trajectory by using the measurement unit and the tool that move together with the movable unit.

In another aspect of the invention, the control device may be configured such that a holding unit provided in the movable unit holds the target and the control unit controls the movable unit based on an external control point positioned at a position different from the movable unit.

With this configuration, the control device can cause the robot to accurately perform work to be performed on the target along the predetermined trajectory by moving the target with respect to the measurement unit and the tool, which is fixed so as not to move, by the movable unit.

Another aspect of the invention is directed to a robot that is controlled by the control device described above.

With this configuration, the robot can accurately perform work to be performed on a target along the predetermined trajectory.

Still another aspect of the invention is directed to a robot system that includes the control device described above, the measurement unit, the tool, and the robot controlled by the control device.

With this configuration, the robot system can cause the robot to accurately perform work to be performed on a target along the predetermined trajectory.

Still another aspect of the invention is directed to a control device which includes a processor, and in which the processor is configured to execute a command to control a movable unit included in a robot so as to perform work on a target using a tool that performs work on the target and a measurement unit that measures a measurement value according to a relative distance between a first position of the target and the tool, and in which the first position includes a portion overlapping the tool when viewed from a direction toward the target from the tool.

With this configuration, the control device can cause the robot to accurately perform work to be performed on the target along a predetermined trajectory.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiment

Figure 1:
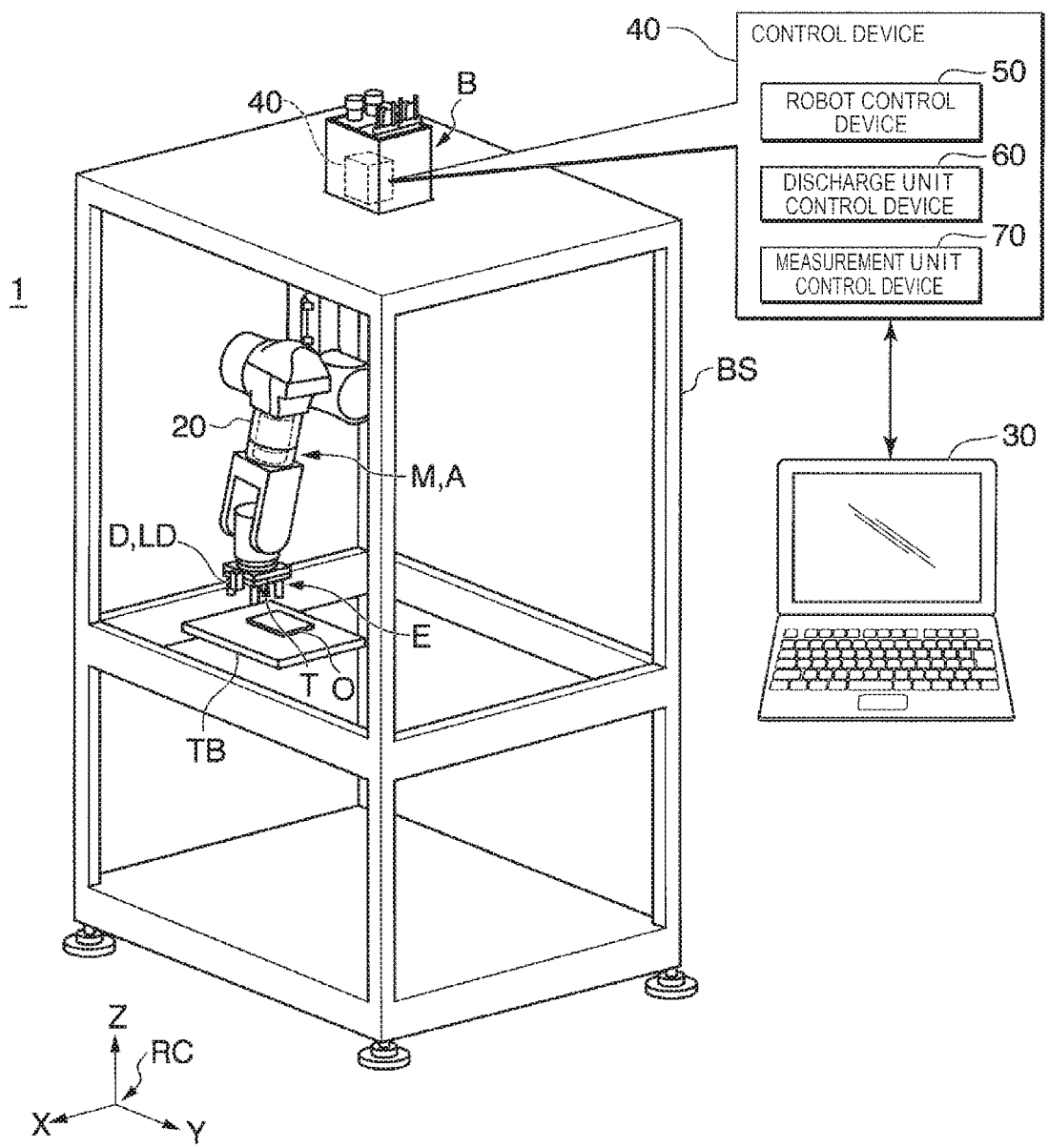
FIG. 1 is a diagram illustrating an example of a configuration of a robot system according to an embodiment.
Figure 2:
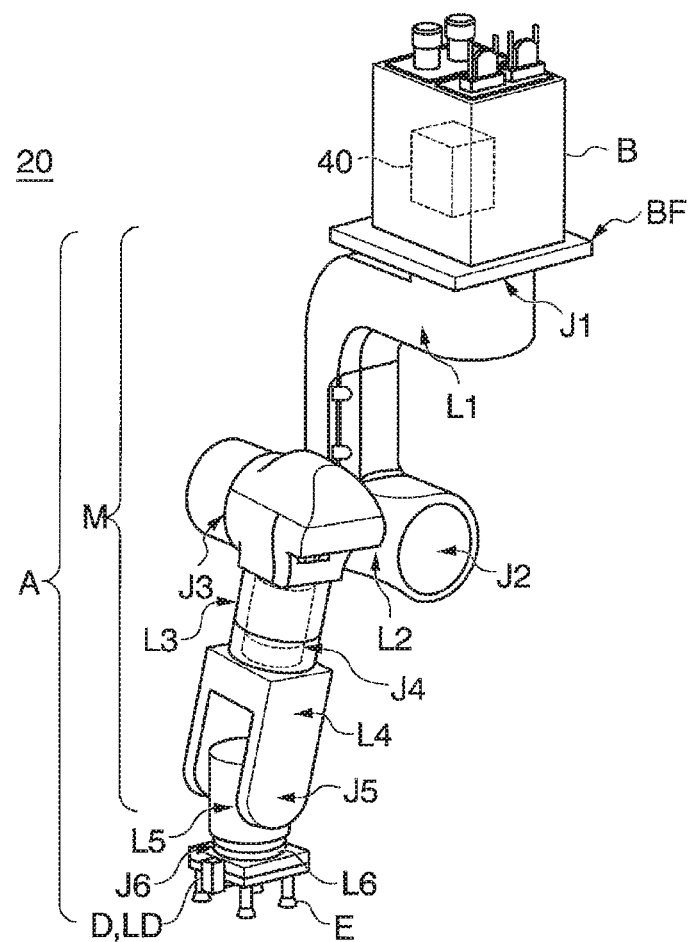
FIG. 2 is a diagram illustrating an example of a configuration of a robot.

In the following, embodiments of the invention will be described with reference to the drawings.
Configuration of Robot System First, a configuration of a robot system 1 will be described with reference to FIGS. 1 to 7. FIG. 1 is a diagram illustrating an example of a configuration of the robot system 1 according to an embodiment. FIG. 2 is a diagram illustrating an example of a configuration of a robot 20. The robot system 1 includes, for example, a robot 20, a discharge unit D, a measurement unit LD (for example, a distance meter), and an information processing terminal 30. Here, the discharge unit D is an example of a tool. The robot system 1 may be configured to include other devices in addition to some of the discharge unit D, the measurement unit LD, and the information processing terminal 30, including the robot 20, or may be configured to include the other devices in addition to all of the robot 20, the discharge unit D, the measurement unit LD, and the information processing terminal 30. The other devices include, for example, an imaging unit (for example, a camera separate from the robot 20), a teaching device (for example, a teaching pendant separate from the information processing terminal 30), and the like. In the robot system 1, some or all of the robot 20, the discharge unit D, and the measurement unit LD may be integrally configured. Further, in the robot system 1, the robot 20 and the information processing terminal 30 may be integrally configured.

In the following, for convenience of explanation, a direction of gravity (vertically downward direction) will be referred to as a downward direction or downward, and a direction opposite to the downward direction will be referred to as an upward direction or upward. In the following, as an example, a case where the downward direction coincides with the negative direction of the Z-axis in the robot coordinate system RC of the robot 20 will be described. A configuration in which the downward direction does not coincide with the negative direction may be adopted.

In this example, the robot 20 is installed on a rack BS. The robot 20 may be configured to be installed on another object such as a floor of a room where the robot 20 is installed, a wall of the room, a ceiling surface of the room, an outdoor ground, a table, a stand and the like, instead of the rack BS.

The rack BS is, for example, a rectangular parallelepiped metal frame. The shape of the rack BS may be other shapes such as a cylindrical shape instead of the rectangular parallelepiped shape. The material of the rack BS may be other material such as resin instead of metal. A flat plate as a ceiling plate is provided at the uppermost portion, which is the uppermost end portion of the end portions of the rack BS. A flat plate as a floor plate is provided at the lowermost portion, which is the lowermost end portion of the end portions of the rack BS. The rack BS is installed on an installation surface. The installation surface is, for example, a floor surface of a room in which the robot 20 is installed. The installation surface may be another surface such as a wall surface of the room, a ceiling surface of the room, an outdoor ground surface or the like, instead of the floor surface. In the robot system 1, the robot 20 is installed on the ceiling plate of the rack BS so that predetermined work can be performed inside the rack BS. In the following, as an example, a case where both the ceiling plate and the floor plate are parallel to the XY plane in the robot coordinate system RC will be described. The XY plane is a plane tensioned by the X-axis and the Y-axis, respectively, in the robot coordinate system RC. Either one or both of the ceiling plate and the floor plate may be nonparallel to the XY plane.

A work stand TB on which an object can be placed is provided inside the rack BS. The work stand TB is provided on the rack BS so as to be included inside a work area of the robot 20 described below. In the following, as an example, a case where the upper surface, which is a surface on the upper side among surfaces of the work stand TB, is parallel to the XY plane in the robot coordinate system RC will be described. The upper surface may be nonparallel to the XY plane. In the example illustrated in FIG. 1, a target O, which is an object to be worked by the robot 20, is placed on the upper surface.

The target O is an industrial part or member to be assembled into a product. In the following, as an example, a case where the target O is a flat plate-shaped plate to be assembled into a product and at least a part of the upper surface, which is the surface on the upper side, among surfaces of the target O has irregularities will be described. The target O may be other objects such as a daily necessity or a living body, instead of the industrial part or member. The shape of the target O may be other shapes such as a disk shape, a rectangular parallelepiped shape, a cylindrical shape, and the like, instead of a flat plate shape. A part or the whole of the upper surface of the target O may be a flat surface having no irregularities.

The robot 20 is a single-arm robot including a base B, a movable unit A supported by the base B, and a control device 40. The single-arm robot is a robot having one arm like the movable unit A in this example. The robot 20 may be a multi-arm robot instead of a single-arm robot. A multi-arm robot is a robot having two or more arms (for example, two or more movable units A). Among the multi-arm robots, a robot having two arms is also called a dual-arm robot. That is, the robot 20 may be a dual-arm robot having two arms, or may be a multi-arm robot having three or more arms (for example, three or more movable units A). Further, the robot 20 may be another robot such as a SCARA robot (horizontal articulated robot), a rectangular coordinate robot, a cylindrical robot, or the like. The orthogonal coordinate robot is, for example, a gantry robot.

The shape of the base B is, for example, a substantially rectangular parallelepiped shape whose longitudinal direction is along the vertical direction. The base B is hollow. One of the surfaces of the base B is provided with a flange BF. The movable unit A is provided on the flange BF. That is, the base B supports the movable unit A by the flange BF. The shape of the base B may be other shapes such as a cube shape, a cylindrical shape, a polyhedron shape, and the like as long as it can support the movable unit A, instead of the substantially rectangular parallelepiped shape. Further, the base B may have a configuration in which the flange BF is not provided.

In the following, for convenience of explanation, description will be made in such a way that the surface, on which the flange BF is provided, of the surfaces of the base B, is referred to as the upper surface, and the surface, which is opposite to the surface on which the flange BF is provided, of the surfaces of the base B is referred to as the lower surface. For example, the base B is installed on the ceiling plate such that the direction from the lower surface of the base B to the upper surface of the base B coincides with the downward direction described above, that is, is installed in the ceiling plate such that the entire work area of the robot 20 is positioned below the ceiling plate of the rack BS. Specifically, for example, an opening (not illustrated) which is penetrated through in the vertical direction and into which the base B can be inserted is formed in the ceiling plate. The opening is smaller than the flange BF. The user can install (attach) the base B to the ceiling plate by fixing the flange BF and the ceiling plate with a plurality of bolts. That is, a plurality of through-holes into which a plurality of bolts are inserted respectively are formed on each of the flange BF and the ceiling plate. The base B may be configured to be installed at another position of the rack BS. Further, a method of fixing the flange BF and the ceiling plate may be another method.

The movable unit A includes a manipulator M. An end effector E is provided on the movable unit A. The movable unit A may be configured to include the manipulator M and an end effector E.

The manipulator M includes a first arm L1 to sixth arm L6 which are six arms (links) and joints J1 to J6 which are six joints. The base B and the first arm L1 are connected by the joint J1. The first arm L1 and the second arm L2 are connected by the joint J2. The second arm L2 and the third arm L3 are connected by the joint J3. The third arm L3 and the fourth arm L4 are connected by the joint J4. The fourth arm L4 and the fifth arm L5 are connected by the joint J5. The fifth arm L5 and the sixth arm L6 are connected by the joint J6. That is, the movable unit A including the manipulator M is a six-axis vertical articulated arm. The movable unit A may be configured to operate with a degree of freedom of 5 axes or less or operate with a degree of freedom of 7 axes or more.

In each of FIG. 1 and FIG. 2, in order to simplify the drawing, the configurations of an actuator, an encoder, a reduction gear, a brake, and the like provided for each of the joints J1 to J6 are omitted. The brake may be an electromagnetic brake or a mechanical brake. Some or all of the joints J1 to J6 may be configured without a reduction gear. Further, some or all of the joints J1 to J6 may be configured not to include a brake.

The first arm L1 is pivotable around a first pivot axis AX1 (for example, see FIG. 3), which is a pivot axis of the joint J1, with respect to the base B. The second arm L2 is pivotable around a second pivot axis AX2 (for example, see FIG. 3), which is a pivot axis of the joint J2, with respect to the first arm L1. The third arm L3 is pivotable around the third pivot axis AX3 (for example, see FIG. 3), which is a pivot axis of the joint J3, with respect to the second arm L2. The fourth arm L4 is pivotable around a fourth pivot axis AX4 (see FIG. 3, for example), which is a pivot axis of the joint J4, with respect to the third arm L3. The fifth arm L5 is pivotable around a fifth pivot axis AX5 (see FIG. 3, for example), which is a pivot axis of the joint J5, with respect to the fourth arm L4. The sixth arm L6 is pivotable around a sixth pivot axis AX6 (see FIG. 3, for example), which is a pivot axis of the joint J6, with respect to the fifth arm L5.

Figure 3:
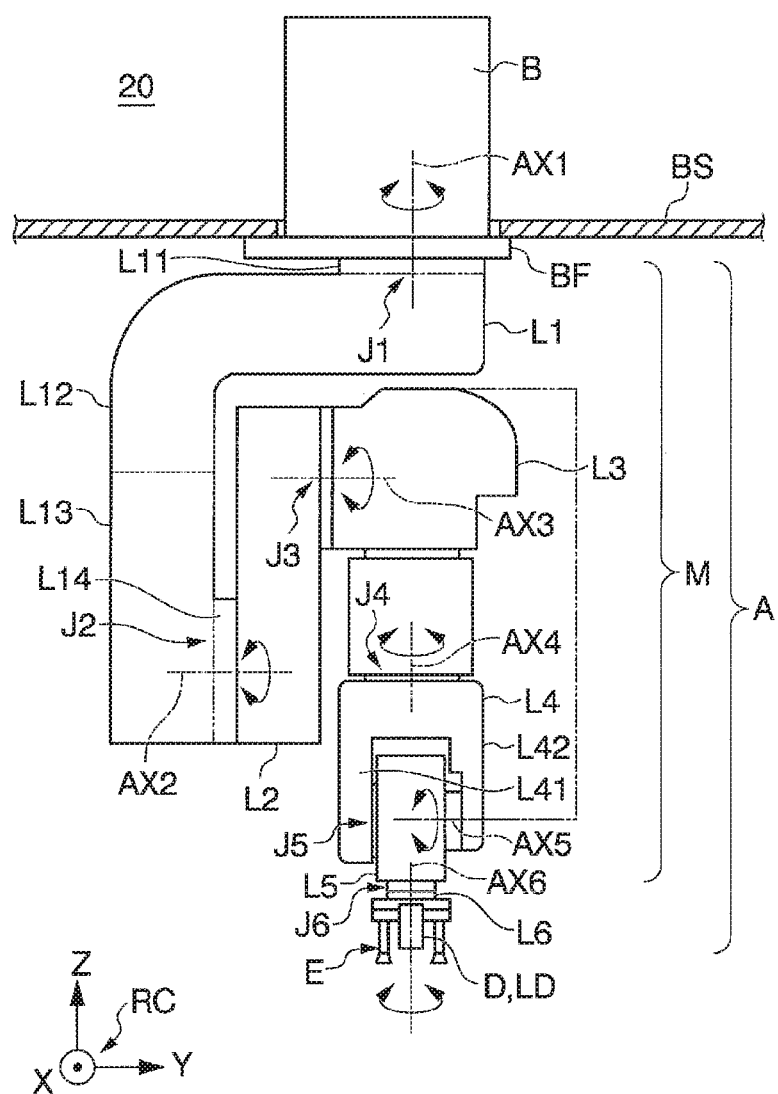
FIG. 3 is a diagram illustrating an example of a robot when viewed in the negative direction of the X-axis in a robot coordinate system, in a case where a second pivot axis is parallel to the Y-axis in the robot coordinate system and a case where a joint is positioned on the negative direction side of the Y-axis than a joint.
Figure 4:
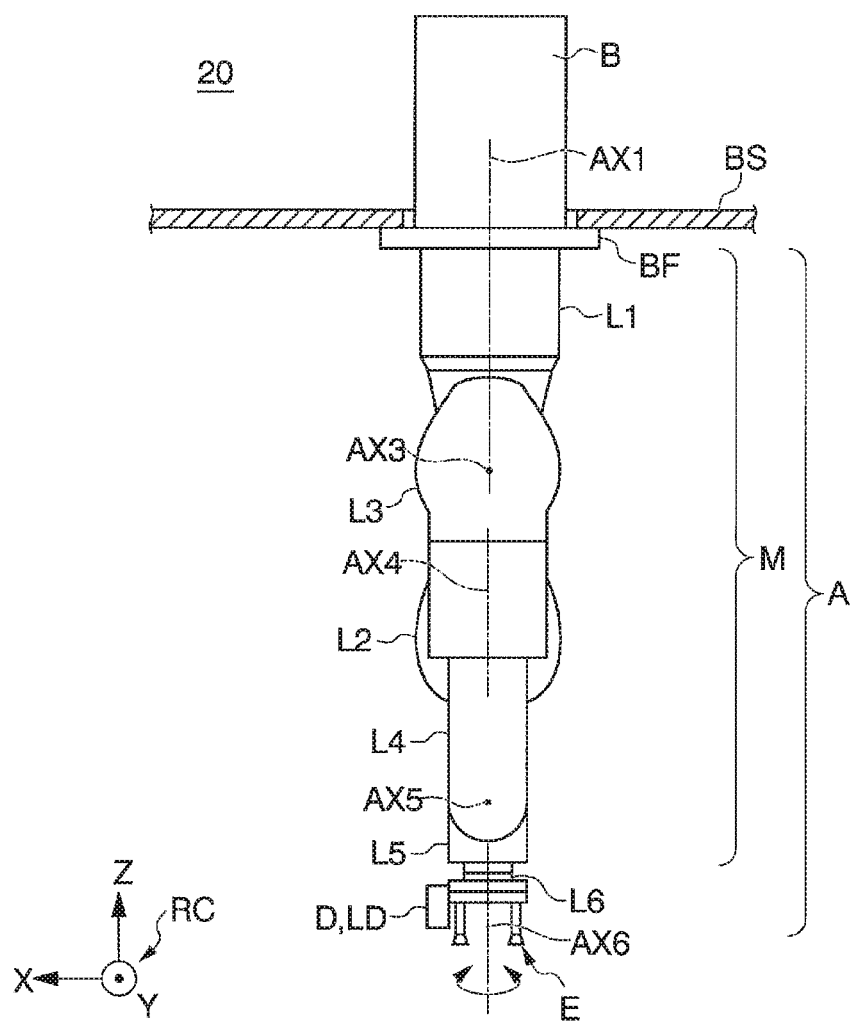
FIG. 4 is a diagram illustrating an example of the robot illustrated in FIG. 3 when the robot is viewed in the negative direction of the Y-axis in the robot coordinate system.

Here, the manipulator M will be described in more detail, with reference to FIGS. 3 to 5. FIG. 3 is a diagram illustrating an example of a robot 20 when viewed in the negative direction of the X-axis in the robot coordinate system RC, in a case where the second pivot axis AX2 is parallel to the Y-axis in the robot coordinate system RC, which is a case where the joint J2 is positioned closer on the negative direction side of the Y-axis than the joint J1. FIG. 4 is a diagram illustrating an example of the robot 20 illustrated in FIG. 3 when the robot 20 is viewed in the negative direction of the Y-axis in the robot coordinate system RC.

In the example illustrated in FIGS. 3 and 4, the direction from the lower surface of the base B to the upper surface of the base B coincides with the downward direction and thus, the joint J2 is positioned below the joint J1.

The joint J2 is not positioned on the extension of the first pivot axis AX1. This is because, as illustrated in FIG. 3, the shape of the first arm L1 is a bent shape when the robot 20 is viewed in the negative direction of the X-axis in the robot coordinate system RC. In this example, the shape of the first arm L1 is a shape which is rounded and curved in a substantially L shape when the robot is viewed in the negative direction of the X-axis. Specifically, the first arm L1 is constituted by four parts L11 to L14. The part L11 is a part, which extends in the downward direction along the first pivot axis AX1 from the base B, among the four portions constituting the first arm L1, in FIG. 3. The part L12 is a part, which extends in the negative direction of the Y-axis in the robot coordinate system RC from the lower end of the part L11, among the four parts. The part L13 is a part, which extends in the downward direction from an end portion, which is on the side opposite to the part L11, of end portions of the part L12, among the four parts. The part L14 is a part, which extends in the positive direction of the Y-axis from an end portion, which is on the side opposite to the part L12, of end portions of the part L13, among the four parts. Here, the parts L11 to L14 may be a single body so as to constitute the first arm L1, or may be separate bodies so as to constitute the first arm L1. In FIG. 3, the parts L12 and L13 are substantially orthogonal when the robot 20 is viewed in the negative direction of the X-axis in the robot coordinate system RC. The shape of the first arm L1 may be another shape.

The shape of the second arm L2 is an elongated shape. The second arm L2 is connected to the tip end portion of the first arm L1, that is, an end portion, which is on a side opposite to the part L13, of end portions of the part L14. In addition, the shape of the second arm L2 may be another shape.

The shape of the third arm L3 is an elongated shape. The third arm L3 is connected to an end portion, which is on a side opposite to the end portion connected to the first arm L1, of end portions of the second arm L2. The shape of the third arm L3 may be another shape.

The fourth arm L4 is connected to the tip end portion of the third arm L3, that is, an end portion, which is on a side opposite to the end portion connected to the second arm L2, of end portions of third arm L3. On the fourth arm L4, a support portion L41 and a support portion L42 which are a pair of support portions facing each other are formed. The support portion L41 and the support portion L42 are used for connection with the fifth arm L5 of the fourth arm L4. That is, the fourth arm L4 is connected to the fifth arm L5 by the support portion L41 and the support portion L42 by allowing the fifth arm L5 to be positioned between the support portion L41 and the support portion L42. The fourth arm L4 is not limited thereto, and may be configured (cantilevered) to support the fifth arm L5 by one support portion, or may be configured to support the fifth arm L5 by three or more support portions. Also, the shape of the fourth arm L4 may be another shape.

The shape of the fifth arm is cylindrical. As described above, the fifth arm L5 is positioned between the support portion L41 and the support portion L42 and is connected to the support portion L41 and the support portion L42. The shape of the fifth arm L5 may be another shape.

The shape of the sixth arm L6 is a flat plate shape. That is, the sixth arm L6 is a flange. The sixth arm L6 is connected to an end portion, which is on a side opposite to the fourth arm L4, of end portions of the fifth arm L5. The end effector E is connected to the sixth arm L6. The shape of the sixth arm L6 may be another shape.

In this example, the second pivot axis AX2 and the third pivot axis AX3 are parallel to each other. The third pivot axis AX3 and the fourth pivot axis AX4 intersect each other. In the examples illustrated in FIGS. 3 and 4, the third pivot axis AX3 and the fourth pivot axis AX4 are orthogonal to each other. The fourth pivot axis AX4 and the fifth pivot axis AX5 intersect each other. In this example, the fourth pivot axis AX4 and the fifth pivot axis AX5 are orthogonal to each other. The fifth pivot axis AX5 and the sixth pivot axis AX6 intersect each other. In this example, the fifth pivot axis AX5 and the sixth pivot axis AX6 are orthogonal to each other.

Here, in the manipulator M, the first arm L1 and the second arm L2 can overlap each other when viewed from the axial direction of the first pivot axis AX1. In the embodiment, matters that the two arms overlap each other when two arms are viewed from a certain direction mean that a ratio of an area where one arm of the two arms overlaps the other arm is equal to or greater than a predetermined ratio. The predetermined ratio is, for example, 90%, but is not limited thereto, and other ratios may be used.

In the manipulator M, the first arm L1 and the second arm L2 can overlap each other when viewed from the axial direction of the second pivot axis AX2. Further, in the manipulator M, the second arm L2 and the third arm L3 can overlap each other when viewed from the axial direction of the second pivot axis AX2.

From the matters described above, the manipulator M can be brought into a compact state by pivoting the joint J2 and the joint J3, respectively. In this example, the compact state is a state in which the distance between the second pivot axis AX2 and the fifth pivot axis AX5 is shortest in the direction along the first pivot axis AX1 and the first pivot axis AX1 and the fourth pivot axis AX4 coincide with each other. That is, the state of the manipulator M illustrated in FIGS. 3 and 4, respectively is a compact state. When the robot 20 illustrated in FIG. 3 is viewed in the negative direction of the Y-axis in the robot coordinate system RC, three arms of the first arm L1, the second arm L2, and the third arm L3 overlap with each other, as illustrated in FIG. 4, in the manipulator M which is in the compact state.

The reason why the state of the manipulator M can be brought into the compact state is that the second arm L2 is formed in such a shape and size that the second arm L2 does not interfere with each of the ceiling plate of the rack BS and the first arm L1 by pivoting of the joint J2.

In this example, in a case where the state of the manipulator M is in the compact state, a length of the first arm L1 is longer than a length of the second arm L2 in the direction along the first pivot axis AX1. The respective lengths of the first arm L1 and the second arm L2 may be other lengths instead.

Figure 5:
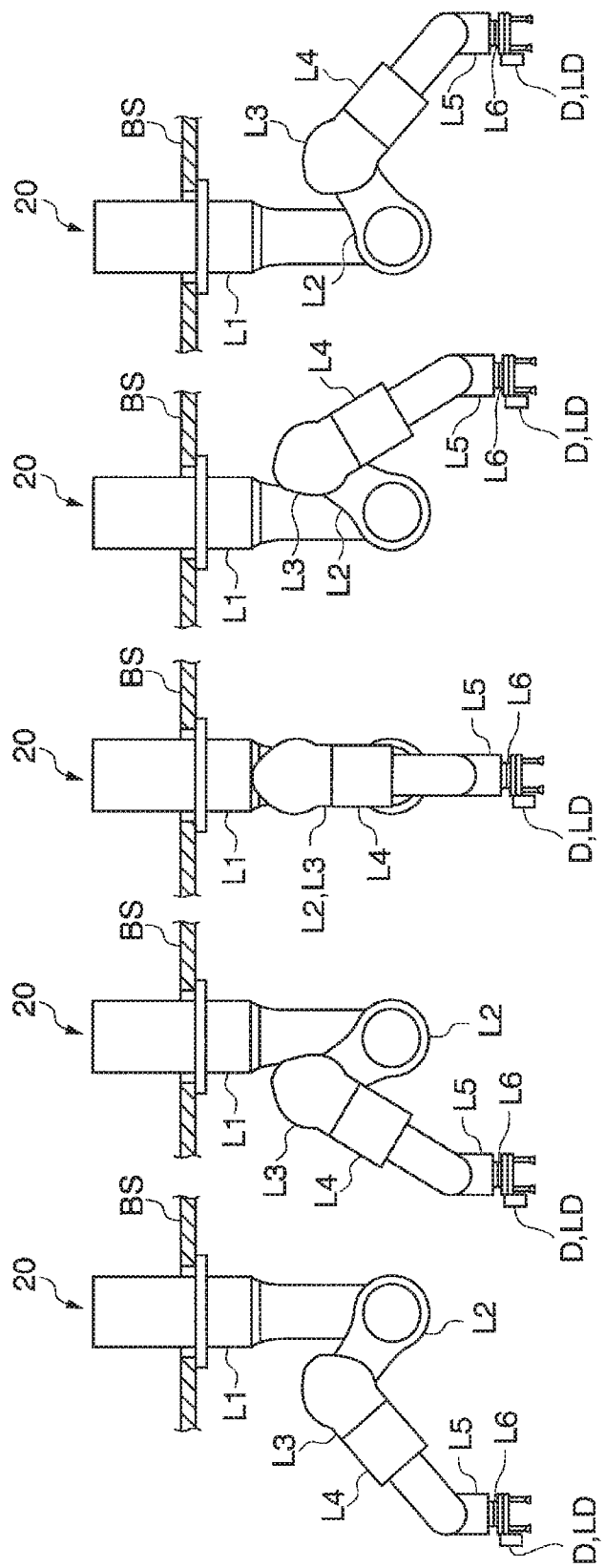
FIG. 5 is a diagram for explaining an operation that goes through a compact state among operations of a manipulator.

Since the state of the manipulator M can be brought into the compact state, as illustrated in FIG. 5, the manipulator M rotates the joint J2 without pivoting the joint J1 to thereby make it possible to move the position of the joint J6 to a position different by 180 degrees around the first pivot axis AX1 after going through the compact state. FIG. 5 is a diagram for explaining the operation that goes through the compact state among operations of the manipulator M. In this example, the position of the joint J6 is represented by a position of the center of gravity of the joint J6. A configuration in which the position of the joint J6 is represented by another position correlated with the joint J6 instead of the position of the center of gravity of the joint J6 may be adopted. More specifically, the manipulator M rotates the joint J2 without pivoting the joint J1 to thereby make it possible to move the sixth arm L6, which is the tip end of the manipulator M, from the left position illustrated on the left side of FIG. 5 to a position different by 180 degrees around the first pivot axis AX1 after going through the compact state. In the operation illustrated in FIG. 5, the sixth arm L6 moves on a straight line when the robot 20 is viewed from the direction along the first pivot axis AX1.

The sum of the lengths of the third arm L3 to the sixth arm L6 is longer than the length of the second arm L2. With this configuration, when the robot 20 is viewed from the direction along the second pivot axis AX2, if the state of the manipulator M is made to coincide with the compact state, the tip ends of the sixth arm L6 can protrude from the second arm L2. As a result, in a case where the end effector E is attached to the sixth arm L6, it is possible to prevent the end effector E from interfering with the first arm L1 and the second arm L2.

As described above, the manipulator M rotates the second pivot axis AX2 without pivoting the first pivot axis AX1 to thereby make it possible to move the end effector E to a position different by 180 degrees around the first pivot axis AX1 after going through the compact state. As a result, the robot 20 can efficiently move the end effector E, and it is possible to reduce a space provided for preventing a part of the robot 20 from interfering with other objects.

When referring back to the description of FIG. 2, the actuators provided for the respective joints J1 to J6 of the manipulator M are communicably connected to a control device 40 by cables. With this configuration, the actuators operate the manipulator M based on the control signal acquired from the control device 40. Wired communication via a cable is performed according to standards such as the Ethernet (registered trademark) and USB, for example. Some or all of the actuators may be configured to be connected to the control device 40 by wireless communication performed according to a communication standard such as the Wi-Fi (registered trademark).

The end effector E is an end effector having a holding portion capable of holding an object by air. The end effector E may be another end effector such as an end effector having a finger portion capable of holding an object, instead of the end effector having the holding portion. In this example, "holding" means to bring an object into a state where the object can be lifted up.

The end effector E is communicably connected to the control device 40 by a cable. With this configuration, the end effector E performs an operation based on the control signal acquired from the control device 40. Wired communication via a cable is performed according to standards such as the Ethernet (registered trademark) and USB, for example. Further, the end effector E may be configured to be connected to the control device 40 by wireless communication performed according to a communication standard such as the Wi-Fi (registered trademark).

In this example, the control device 40 is provided (built-in) inside the base B. The control device 40 may be provided separately from the robot 20 instead. In this case, the robot system 1 includes the robot 20, the discharge unit D, the measurement unit LD, the information processing terminal 30, and the control device 40.

The control device 40 includes, for example, a robot control device 50, a discharge unit control device 60, and a measurement unit control device 70. In the control device 40, some or all of the robot control device 50, the discharge unit control device 60, and the measurement unit control device 70 may be integrally configured. Further, the control device 40 may be configured to include other devices in addition to some of the robot control device 50, the discharge unit control device 60, and the measurement unit control device 70, and may be configured to include other devices in addition to all of the robot control device 50, the discharge unit control device 60, and the measurement unit control device 70.

The robot control device 50 controls the robot 20. More specifically, the robot control device 50 sets a control point T (see FIG. 1), which is an imaginary point moving together with the movable unit A of the robot 20, to a predetermined position according to the movable unit A. The control point T is, for example, a tool center point (TCP). The control point T may be another virtual point that moves together with the movable unit A, instead of the TCP. The predetermined position is, for example, a position of the center of gravity of the end effector E. The predetermined position may be other position corresponding to the movable unit A, instead of the position of the center of gravity.

A control point coordinate system that is a three-dimensional orthogonal coordinate system that moves together with the control point T is correlated with the control point T. The position of the control point T is represented by the position of the origin of the control point coordinate system in the robot coordinate system RC. The orientation of the control point T is represented by the direction in the robot coordinate system RC of each coordinate axis in the control point coordinate system.

For example, the robot control device 50 operates the robot 20 so that the position and orientation specified by an operation program coincide with the position and orientation of the control point T, based on the operation program stored in advance by the user. The robot control device 50 acquires measurement information indicating a measurement value measured by the measurement unit LD to be described below via the measurement unit control device 70, and operates the robot 20 based on the acquired measurement information. Further, the robot control device 50 operates the robot 20 based on both of the operation program described above and the measurement information described above.

In response to a request from the robot control device 50, the discharge unit control device 60 causes the discharge unit D to discharge the discharge substance.

In response to the request from the robot control device 50, the measurement unit control device 70 acquires measurement information indicating the measurement value measured by the measurement unit LD from the measurement unit LD. The measurement unit control device 70 outputs the acquired measurement information to the robot control device 50.

Figure 6:
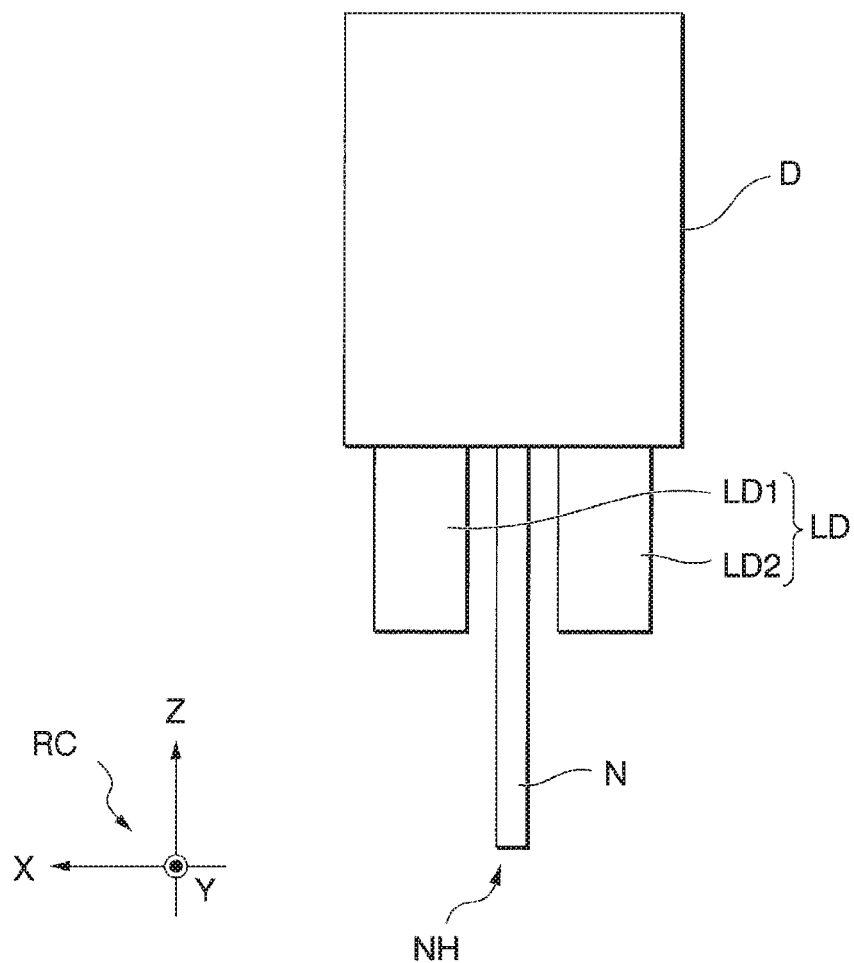
FIG. 6 is a diagram illustrating an example of a discharge unit in a case where the discharge unit attached to the robot illustrated in FIG. 4 is viewed in the negative direction of the Y-axis in the robot coordinate system.
Figure 7:
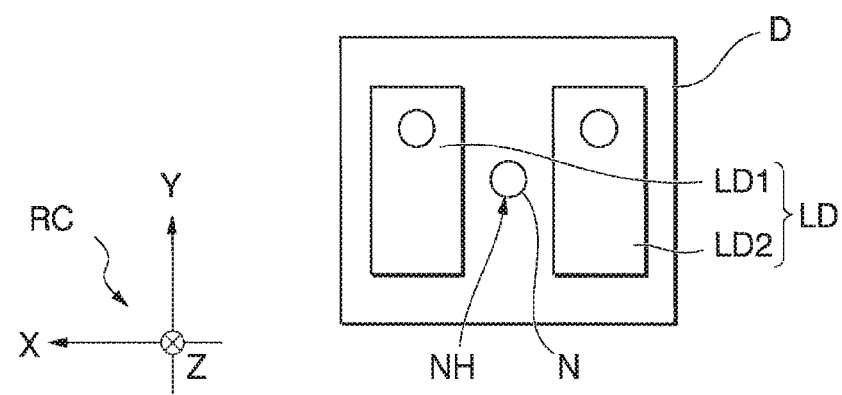
FIG. 7 is a diagram illustrating an example of the discharge unit in a case where the discharge unit attached to the robot illustrated in FIG. 4 is viewed in the positive direction of the Z-axis in the robot coordinate system.

The discharge unit D is a dispenser capable of discharging the discharge substance. Here, the discharge unit D will be described with reference to FIGS. 6 and 7. FIG. 6 is a diagram illustrating an example of the discharge unit D when the discharge unit D attached to the robot 20 illustrated in FIG. 4 is viewed in the negative direction of the Y-axis in the robot coordinate system RC. FIG. 7 is a diagram illustrating an example of the discharge unit D when the discharge unit D attached to the robot 20 illustrated in FIG. 4 is viewed in the positive direction of the Z-axis in the robot coordinate system RC.

The discharge unit D discharges discharge substance in response to a request from the discharge unit control device 60. That is, the discharge unit D is a dispenser including a discharge port NH capable of discharging the discharge substance to the target O. The discharge substance is material that can be discharged such as liquid, gas, a particulate. For example, the discharge substance is an adhesive. The discharge substance may be other substances such as grease instead of the adhesive.

In the following, as an example, a case where the discharge unit D is a contact-type dispenser including a nozzle (or needle) N having the discharge port NH will be described. The discharge unit D may be a non-contact type dispenser capable of discharging the discharge substance to the target O without contacting the target O, instead of the contact type dispenser having the nozzle N.

More specifically, the discharge unit D includes the nozzle N, a syringe portion (not illustrated), and an air injection portion (not illustrated) for injecting air into the syringe portion. The discharge port NH included in the nozzle N is a hole for discharging the discharge substance contained in the syringe portion. The syringe portion is a container having a space for containing discharge substances therein. That is, in the discharge unit D, the air injecting portion injects air into the inside of the syringe portion to thereby discharge the discharge substance contained in the syringe portion from the discharge port NH through the nozzle N by pressure of the air.

In this example, the discharge unit D is included in the end effector E (for example, see any of FIGS. 1 to 4). For that reason, the position at which the discharge unit D can discharge the discharge substance varies according to movement of the movable unit A. In the examples illustrated in FIGS. 6 and 7, a discharge direction, in which the discharge substance is discharged from the discharge port NH, coincides with the downward direction, that is, the negative direction of the Z-axis in the robot coordinate system RC. Here, as an example, a case where the discharge direction coincides with the downward direction, that is, the negative direction when the orientation of the control point T coincides with a predetermined orientation which is a predetermined orientation will be described below. In this case, a configuration in which the discharge direction does not coincide with the downward direction, that is, the negative direction may be adopted. Further, if the discharge unit D is configured to move together with the end effector E by some mechanism, a configuration in which the discharge unit D is provided on another object other than the robot 20 may be adopted.

A shape of the part of the discharge unit D other than the nozzle N is, in this example, a rectangular parallelepiped shape. The shape may be another shape such as a cylindrical shape instead of a rectangular parallelepiped shape. Here, the nozzle N is attached to one of the six surfaces of the part having a rectangular parallelepiped shape. In the following, for convenience of explanation, the surface on which the nozzle N is attached among the six surfaces will be referred to as the lower surface of the discharge unit D and will be described.

The discharge unit D is communicably connected to the discharge unit control device 60 by a cable. With this configuration, the discharge unit D performs an operation based on a control signal acquired from the discharge unit control device 60. Wired communication via the cable is performed according to a standard such as the Ethernet (registered trademark) and USB, for example. Further, the discharge unit D may be configured to be connected to the discharge unit control device 60 by wireless communication performed according to a communication standard such as the Wi-Fi (registered trademark).

The measurement unit LD measures a measurement value corresponding to the relative distance between the first position of the target O and the discharge unit D as a measurement result. A first position will be described below. More specifically, the measurement unit LD is, for example, a laser beam displacement meter. In this example, as illustrated in FIGS. 6 and 7, the measurement unit LD is provided on the lower surface of the discharge unit D. In other words, when the lower surface of the discharge unit D is viewed along the discharge direction described above, the measurement unit LD is provided on the lower surface so as to be included inside the outline of the lower surface. For that reason, the measurement unit LD moves together with the discharge unit D. A configuration in which the measurement unit LD is provided in another part of parts of the discharge unit D, instead of the lower surface, may be adopted. If the measurement unit LD is configured to move together with the discharge unit D by some mechanism, a configuration in which the measurement unit LD is provided on another object other than the discharge unit D may be adopted. In response to a request from the measurement unit control device 70, the measurement unit LD outputs measurement information indicating the measured measurement value to the measurement unit control device 70. The measurement information may include other information in addition to the information indicating the measurement value.

More specifically, in this example, the measurement unit LD includes a light-emitting portion LD1 that emits a laser beam (that is, light) and a light-receiving portion LD2 that receives the laser beam (that is, light) emitted from the light-emitting portion LD1. The light-emitting portion LD1 may be configured to emit a laser beam of visible light as the laser beam, configured to emit a laser beam of infrared light, or configured to emit a laser beam belonging to another wavelength band. Further, instead of a laser beam, the light-emitting portion LD1 may be configured to emit a light beam that can be received by the light-receiving unit LD2 among the light beams that is not a laser beam.

In a case where the measurement unit LD emits the laser beam to the upper surface of the target O from the light-emitting portion LD1, the laser beam emitted from the light-emitting portion LD1 is reflected on the upper surface. Here, the first position described above is a position, which is irradiated with the laser beam in this case, among the positions included in the upper surface. That is, in this case, the laser beam is reflected at the first position of the target O. Then, at least a part of the laser beams reflected at the first position of the target O is received by the light-receiving portion LD2. The light-receiving portion LD2 measures a value corresponding to at least a part of the received laser beams as a measurement value. This value is, for example, a difference between a light amount of the laser beams emitted by the light-emitting portion LD1 and a light amount of the laser beams received by the light-receiving portion LD2. The difference varies according to the relative distance between the position of the discharge unit D provided with the measurement unit LD and the first position. More specifically, in a case where the orientation of the control point T coincides with the predetermined orientation, the difference varies according to the height of the discharge unit D. The height of the discharge unit D is a distance along the Z-axis direction in the robot coordinate system RC and is a relative distance between the position of the discharge unit D and the first position. That is, the measurement value measured by the measurement unit LD indicates the height of the discharge unit D in this case. Here, in this example, the position of the discharge unit D is represented by the position of the center of gravity of the discharge unit D. A configuration in which the position of the discharge unit D is represented by another position according to the discharge unit D, instead of the position of the center of gravity, may be adopted. The value according to at least a part of the laser beams received by the light-receiving portion LD2 may be another value according to the relative distance between the discharge unit D and the first position, instead of the difference.

Further, when the lower surface of the discharge unit D is viewed along the discharge direction, as illustrated in FIG. 7, each of the light-emitting portion LD1 and the light-receiving portion LD2 is provided on the lower surface so that the discharge port NH of the discharge unit D is positioned between the light-emitting portion LD1 and the light-receiving portion LD2. With this configuration, the distance between the first position irradiated with the laser beam by the measurement unit LD at a certain timing and a dischargeable position which is the position where the discharge unit D can discharge the discharge substance at the certain timing among the positions included in the upper surface of the target O can be shortened.

Here, when the orientation of the control point T coincides with the predetermined orientation, each of the discharge position at the certain timing TM and the first position at the timing TM is included inside the outline of a figure obtained by projecting the shape of the discharge unit D onto the upper surface of the target O along the discharge direction. Here, the discharge position is a position at which the discharge unit D discharges the discharge substance at the timing TM among the positions included in the upper surface of the target O. The first position is a position which is irradiated with the laser beam by the measurement unit LD at the timing TM among the positions included in the upper surface.

Figure 8:
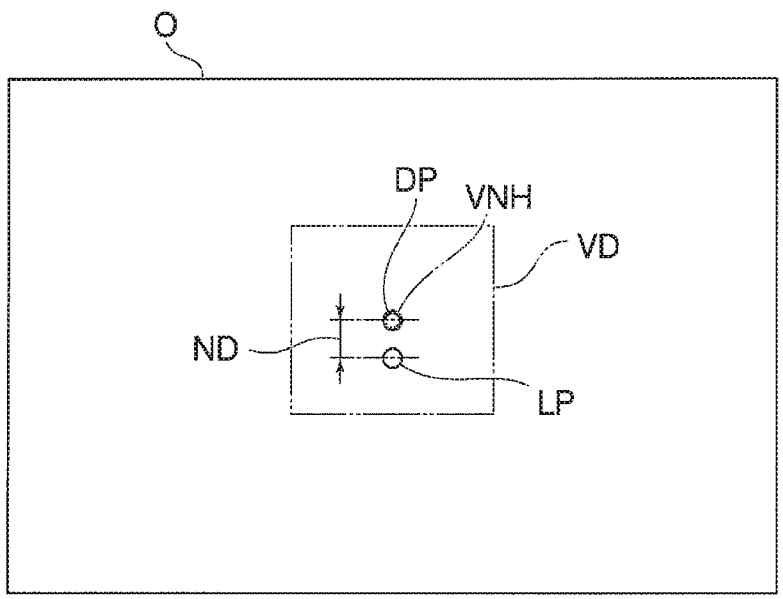
FIG. 8 is a diagram illustrating an example of a relative positional relationship in a case where an orientation of a control point coincides with a predetermined orientation, which is a relative positional relationship between a discharge position and a first position at the timing.

FIG. 8 is a diagram illustrating an example of a relative positional relationship in a case where an orientation of the control point T coincides with a predetermined orientation, which is a relative positional relationship between a discharge position and the first position at the timing TM. FIG. 8 is a diagram illustrating an example of the positional relationship in a case where the upper surface of the target O is viewed in the discharge direction in this case. In FIG. 8, in order to simplify the drawing, irregularities on the upper surface of the target O is omitted. An outline VD illustrated in FIG. 8 illustrates the outline of a figure obtained by projecting the shape of the discharge unit D onto the top surface along the discharge direction at the timing TM. The position indicated by a circle LP illustrated in FIG. 8 (that is, position of the center of the circle LP) illustrates an example of the first position at the timing TM. The position indicated by a circle DP illustrated in FIG. 8 (that is, position of the center of the circle DP) illustrates an example of the discharge position at the timing TM. As illustrated in FIG. 8, each of the discharge position and the first position at the timing TM is included inside the outline VD of the figure obtained by projecting the shape of the discharge unit D onto the top surface along the discharge direction at the timing TM. That is, the first position at the timing TM overlaps the discharge unit D when the lower surface of the discharge unit D is viewed along the discharge direction. In this case, a configuration in which the first position at the timing TM partially overlaps the discharge unit D may be adopted.

A circle VNH illustrated in FIG. 8 represents the outline of a figure obtained by projecting the outline of the discharge port NH at the timing TM onto the upper surface of the target O along the discharge direction in a case where the orientation of the control point T coincides with the predetermined orientation. In FIG. 8, the circle VNH is represented by a circle smaller than the circle DP, but the size of the discharge port NH may be smaller than the size of the discharge substance at the discharge position indicated by the circle DP, may be larger than the size of the discharge substance at the discharge position indicated by the circle DP, or may be the same size as the size of the discharge substance. As illustrated in FIG. 8, the circle VNH and the circle LP do not overlap each other. That is, the first position at the timing TM does not overlap the discharge port NH when the lower surface of the discharge unit D is viewed along the discharge direction. The distance ND illustrated in FIG. 8 is, for example, the distance between the first position and the discharge position on the plane orthogonal to the discharge direction in the case where the orientation of the control point T coincides with the predetermined orientation. Here, the position of the measurement unit LD on the lower surface of the discharge unit D is adjusted so that a separation distance which is a predetermined distance according to each of the size of the discharge substance discharged to the discharge position and the size of the discharge port NH and the distance ND coincide with each other. For example, the separation distance is, for example, a distance equal to or greater than the sum of the radius of the discharge substance and the radius of the discharge port NH, for example, in a case where the shape of the discharge substance discharged to the discharge position can be approximated to be a circular shape centered on the discharge position and a case where the shape of the discharge port NH is circular. The separation distance may be any distance as long as the first position is positioned inside the outline VD, instead of the distance. However, it is desirable for the separation distance to be a short distance.

The measurement unit LD is communicably connected to the measurement unit control device 70 by a cable. With this configuration, the measurement unit LD performs an operation based on the control signal acquired from the measurement unit control device 70. Wired communication via the cable is performed according to standards such as the Ethernet (registered trademark) and USB, for example. Further, the measurement unit LD may be configured to be connected to the measurement unit control device 70 by wireless communication performed according to a communication standard such as the Wi-Fi (registered trademark).

The information processing terminal 30 is an information processing terminal such as a notebook personal computer (PC), a desktop pc, a tablet pc, a teaching pendant, a workstation, a multifunctional mobile phone terminal (smartphone), a cellular phone terminal, and a personal digital assistant (PDA).

The information processing terminal 30 outputs an operation program to the robot control device 50 based on an operation received from the user, and causes the robot control device 50 to store the operation program. The information processing terminal 30 outputs teaching point information to the robot control device 50 based on the operation received from the user, and causes the robot control device 50 to store the teaching point information.

The teaching point information is information indicating each of a plurality of teaching points. The teaching point is an imaginary point that is a target for the robot 20 to make the control point T described above coincident therewith. The teaching point is correlated with teaching point position information which is information indicating the position of the teaching point in the robot coordinate system RC and teaching point orientation information which is information indicating the orientation of the teaching point in the robot coordinate system RC. In a case where the robot 20 makes the control point T coincident with a certain teaching point, the position of the control point T coincides with the position of the teaching point. In this case, the orientation of the control point T coincides with the orientation of the teaching point.

The information processing terminal 30 is communicably connected to the robot control device 50 via a cable. Wired communication via the cable is performed according to standards such as the Ethernet (registered trademark) and USB, for example. The information processing terminal 30 may be configured to be connected to the robot control device 50 by wireless communication performed according to a communication standard such as the Wi-Fi (registered trademark).

Hardware Configuration of Robot Control Device

Figure 9:
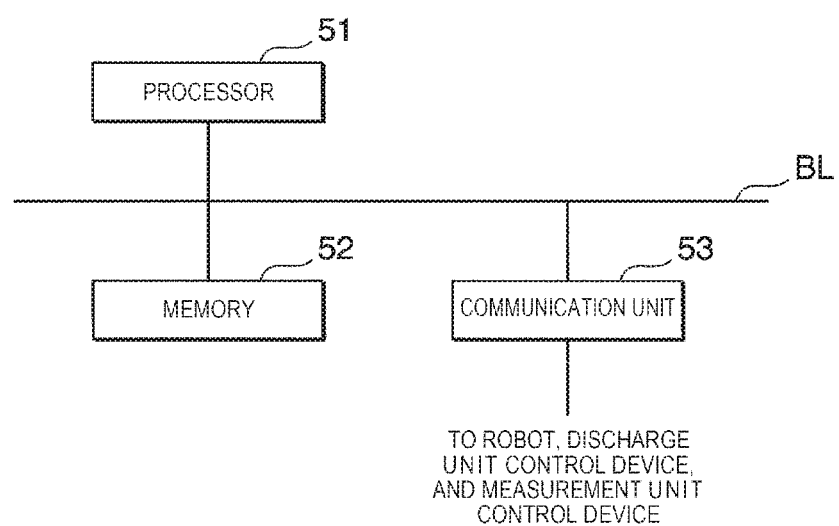
FIG. 9 is a diagram illustrating an example of a hardware configuration of a robot control device.

In the following, a hardware configuration of the robot control device 50 will be described with reference to FIG. 9. FIG. 9 is a diagram illustrating an example of a hardware configuration of the robot control device 50.

The robot control device 50 includes, for example, a processor 51, a memory 52, and a communication unit 53. The robot control device 50 communicates with each of the robot 20, the discharge unit control device 60, and the measurement unit control device 70 via the communication unit 53. These components are communicably connected to each other via a bus BL.

The processor 51 is, for example, a central processing unit (CPU). Instead of the CPU, the processor 51 may be another processor such as a field programmable gate array (FPGA). Instead of the CPU built in the robot control device 50, the processor 51 may be constituted by a CPU built in another device, and may be constituted by both a CPU built in the robot control device 50 and a CPU built in another device. The processor 51 executes various programs (various commands) stored in the memory 52.

The memory 52 includes storage devices such as a hard disk drive (HDD), a solid state drive (SSD), an electrically erasable programmable read-only memory (EEPROM), a read-only memory (ROM), and a random access memory (RAM). The memory 52 may be an external storage device connected by a digital input and output port such as the USB or the like instead of the storage device built in the robot control device 50, or may be constituted by both a storage device built in the robot control device 50 and a storage device built in another device. The memory 52 stores various information, various images, operation programs, and the like to be processed by the robot control device 50. The communication unit 53 is configured to include, for example, a digital input and output port such as the USB, the Ethernet (registered trademark) port, and the like.

The robot control device 50 may be configured to include either one or both of an input device such as a keyboard, a mouse, and a touch pad, and a display device including a display.

Functional Configuration of Robot Control Device

In the following, a functional configuration of the robot control device 50 will be described with reference to FIG.

Figure 10:
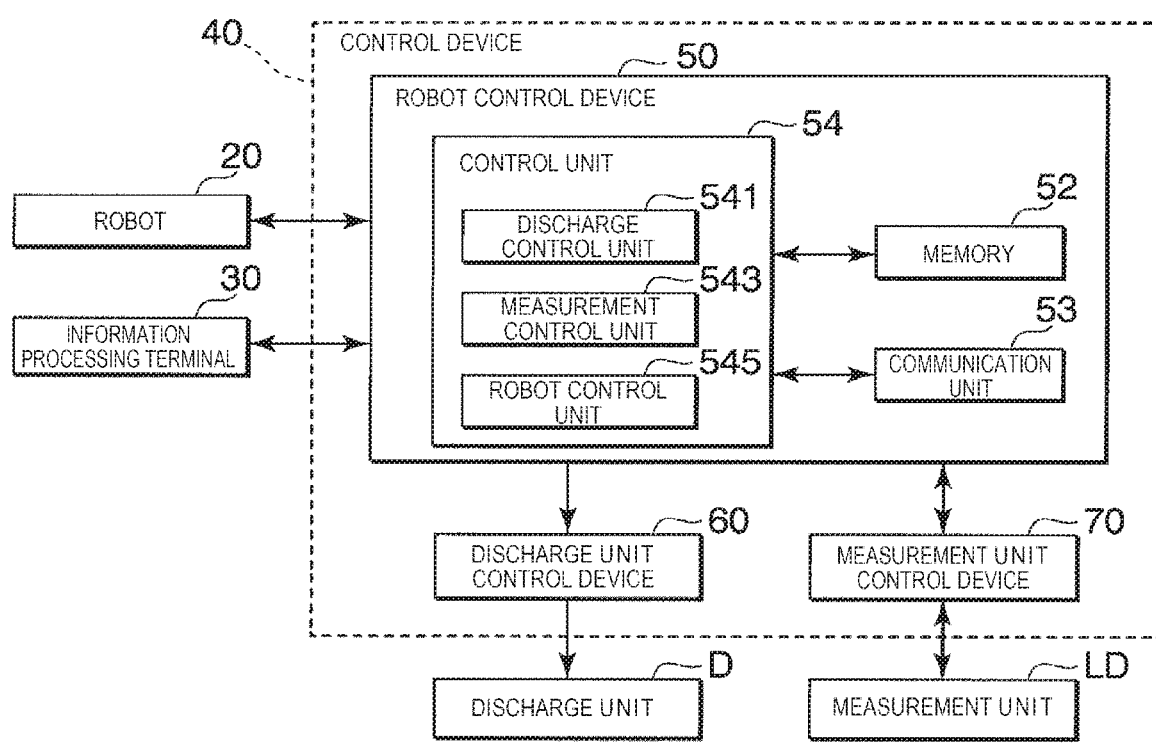
FIG. 10 is a diagram illustrating an example of a functional configuration of the robot control device.

10. FIG. 10 is a diagram illustrating an example of the functional configuration of the robot control device 50.

The robot control device 50 includes a memory 52, a communication unit 53, and a control unit 54.

The control unit 54 controls the entirety of the robot control device 50. The control unit 54 includes a discharge control unit 541, a measurement control unit 543, and a robot control unit 545. These functional units included in the control unit 54 are realized, for example, by executing various programs stored in the memory 52 by the processor 51. In addition, some or all of the functional units may be hardware functional units such as a large scale integration (LSI) and an application specific integrated circuit (ASIC).

The discharge control unit 541 causes the discharge unit control device 60 to control the discharge unit D. For example, the discharge control unit 541 controls the discharge unit control device 60 to cause the discharge unit D to discharge the discharge substance.

The measurement control unit 543 causes the measurement unit control device 70 to control the measurement unit LD. For example, the measurement control unit 543 controls the measurement unit control device 70 to cause the measurement unit control device 70 to acquire measurement information indicating the measurement value measured by the measurement unit LD, and acquires the measurement information acquired by the measurement unit control device 70 from the measurement unit control device 70.

The robot control unit 545 controls the robot 20.

Processing by a Robot Control Device that Causes a Robot to Perform Work

Figure 11:
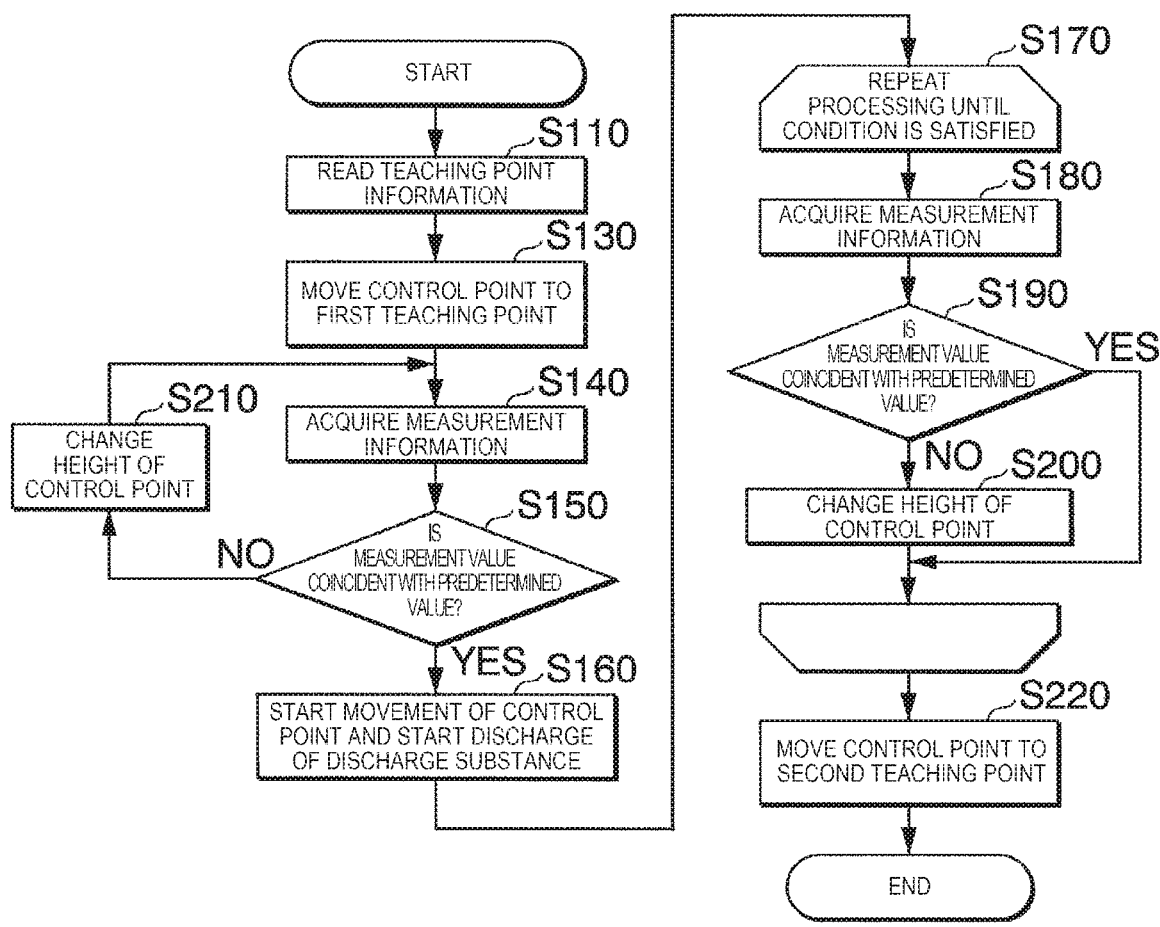
FIG. 11 is a diagram illustrating an example of a flow of processing with which the robot control device causes the robot to perform predetermined work.

In the following, with reference to FIG. 11, a process by which the robot control device 50 causes the robot 20 to perform predetermined work will be described. FIG. 11 is a diagram illustrating an example of a flow of a process in which the robot control device 50 causes the robot 20 to perform predetermined work.

In the following, in order to simplify the description, description will be made on the case where the robot control device 50 operates the robot 20 while keeping the orientation of the control point T coincident with the predetermined orientation. For example, the robot control device 50 causes the robot 20 to perform work of discharging the discharge substance from the discharge unit D to the upper surface of the target O along a predetermined trajectory, which is a predetermined trajectory on the XY plane in the robot coordinate system RC, as the predetermined work. Further, for example, when the robot is caused to perform predetermined work, the robot control device 50 moves the discharge unit D along the predetermined trajectory while keeping the height of the discharge unit D at a predetermined height which is a predetermined height. A case of work of discharging the discharge substance onto the upper surface will be described. The predetermined height is a height corresponding to the diameter of the discharge port NH and is, for example, the height of the discharge unit D in the case where the distance between the upper surface of the target O and the discharge port NH is 0.2 mm. The robot control device 50 may be configured to cause the robot 20 to perform other work using the discharge unit D. The robot control device 50 may be configured to move the discharge unit D along the predetermined trajectory while changing the height of the discharge unit D to a certain height which is a predetermined height when causing the robot 20 to perform predetermined work or may be configured to move the discharge unit D along another trajectory different from the predetermined trajectory when causing the robot 20 to perform the work.

As an example, a case where the predetermined trajectory is a linear trajectory will be described below. In this case, as will be described below, the robot control device 50 can cause the robot 20 to perform predetermined work based on teaching point information indicating each of the two teaching points. With this configuration, the robot control device 50 can shorten the time required for work of causing the robot control device 50 to learn the teaching point information, among pieces of works by the user. The predetermined trajectory may be a trajectory having a curved portion. In this case, the robot control device 50 causes the robot 20 to perform a predetermined work based on teaching point information indicating each of three or more teaching points.

In the following, description will be made on a case where the robot control unit 545 has already read the operation program stored in advance in the memory 32 from the memory 32 at the timing before processing of step S110 illustrated in FIG. 11 is executed.

The robot control unit 545 reads each of first teaching point information indicating the first teaching point and second teaching point information indicating the second teaching point among the teaching point information stored in advance in the memory 32 from the memory 32 (Step S110). The robot control unit 545 may be configured to read teaching point information indicating each of three or more teaching points from the memory 32 in step S110.

The first teaching point is a teaching point with which the control point T is made coincident at the timing before the start of the work when the robot 20 performs a predetermined work.

A first plane position which is a position on the XY plane in the robot coordinate system RC among positions of the first teaching point is a position at which the position of the discharge unit D coincides with a position of the start point of the predetermined trajectory described above when the first teaching point and the control point T coincide with each other in a case where the upper surface of the target O is viewed in the negative direction of the Z-axis in the robot coordinate system RC. In addition, when the first teaching point coincides with the control point T, a first height position which is a position on the Z-axis in the robot coordinate system RC among the positions of the first teaching point is a position at which the height of the discharge unit D coincides with an initial height which is a predetermined height. The initial height is, for example, a height higher than the predetermined height described above. The initial height may be the same height as the predetermined height or may be a height lower than the predetermined height.

The orientation of the first teaching point is an orientation in which the orientation of the control point T coincides with the predetermined orientation in a case where the first teaching point and the control point T coincide with each other. The orientation of the first teaching point may be an orientation in which the orientation of the control point T does not coincide with the predetermined orientation in this case.

The second teaching point is a teaching point with which the control point T is made coincident at the timing after the end of the work when the robot 20 performs a predetermined work.

A second plane position which is a position on the XY plane in the robot coordinate system RC among positions of the second teaching point is a position at which the position of the discharge unit D coincides with a position of the end point of the predetermined trajectory when the second teaching point and the control point T coincide with each other in a case where the upper surface of the target O is viewed in the negative direction of the Z-axis in the robot coordinate system RC. In addition, when the second teaching point and the control point T coincide with each other, a second height position which is a position on the Z-axis in the robot coordinate system RC among the positions of the second teaching point is a position at which the height of the discharge unit D coincides with a final height which is a predetermined height when the second teaching point and the control point T coincide with each other. In this example, the final height is the same height as the initial height. That is, in this example, the final height is a height higher than the predetermined height. The final height may be different from the initial height. In this case, the final height may be a height higher than the predetermined height, may be the same height as the predetermined height, or may be a height lower than the predetermined height.

The orientation of the second teaching point is an orientation in which the orientation of the control point T coincides with the predetermined orientation in a case where the second teaching point and the control point T coincide with each other. The orientation of the second teaching point may be an orientation in which the orientation of the control point T does not coincide with the predetermined orientation in this case.

After the processing of step S110 is performed, the robot control unit 545 operates the robot 20 so that the first teaching point indicated by first teaching point information read from the memory 32 in step S110 coincides with the control point T, based on the operation program read from the memory 32 in advance, and moves the control point T to the first teaching point (step S130).

Next, the measurement control unit 543 controls the measurement unit control device 70 to cause the measurement unit control device 70 to acquire measurement information indicating the measurement value measured by the measurement unit LD from the measurement unit LD, and acquires the measurement information acquired by the measurement unit control device 70 from the measurement unit control device 70 (step S140).

Next, the robot control unit 545 determines whether or not the measurement value indicated by measurement information acquired by the measurement control unit 543 in step S140 coincides with a predetermined value that is a predetermined value (step S150). The predetermined value is a value measured by the measurement unit LD in a case where the height of the discharge unit D coincides with the predetermined height. That is, processing of step S150 is processing in which the robot control unit 545 determines whether or not the height of the discharge unit D coincides with the predetermined height.

In a case where it is determined that the measurement value indicated by the measurement information acquired by the measurement control unit 543 in step S140 does not coincide with the predetermined value (NO in step S150), the robot control unit 545 determines that the height of the discharge unit D does not coincide with the predetermined height. Then, the robot control unit 545 controls the robot 20 and changes the position in the Z-axis direction of the robot coordinate system RC among the positions of the control point T so that the measurement value and the predetermined value coincide with each other (step S210). With this configuration, the robot control unit 545 can make the height coincide with the predetermined height. After making the height coincide with the predetermined height, the measurement control unit 543 transitions to step S140 to control the measurement unit control device 70, causes the measurement unit control device 70 to acquire measurement information indicating the measurement value detected by the measurement unit LD from the measurement unit LD, and acquires the measurement information acquired by the measurement unit control device 70 from the measurement unit control device 70 again. On the other hand, in a case where it is determined that the measurement value indicated by the measurement information acquired by the measurement control unit 543 in step S140 coincides with the predetermined value (YES in step S150), the robot control unit 545 determines that the height of the discharge unit D coincides with the predetermined height. The robot control unit 545 causes the robot 20 to start an operation of moving the control point T such that the second plane position described above coincides with the position of the control point T on the XY plane in the robot coordinate system RC, based on the operation program read from the memory 32 in advance and second teaching point information read from the memory 32 in step S110. In this case, the discharge control unit 541 controls the discharge unit control device 60 to start discharge of the discharge substance by the discharge unit D (step S160). Here, in the operation that the robot control unit 545 causes the robot 20 to start in step S160, the robot control unit 545 moves the control point T such that the control point T moves in a straight line from the first teaching point to the second teaching point when the control point T is viewed in the negative direction of the Z-axis in the robot coordinate system RC. In the following, as an example, description will be made on a case where the robot control unit 545 does not change the orientation of the control point T in the operation started in step S160. The robot control unit 545 may be configured to change the orientation of the control point T in this operation.

After movement of the control point T by the robot 20 and discharge of the discharge substance by the discharge unit D are started by the processing of step S160, the robot control unit 545 repeatedly performs processing from step S180 to step S200 until a predetermined condition is satisfied (step S170). Here, a condition is that the second plane position coincides with the position of the control point T on the XY plane in the robot coordinate system RC. As for the condition, other conditions may be available instead of the condition described above.

The measurement control unit 543 controls the measurement unit control device 70 to cause the measurement unit control device 70 to acquire measurement information indicating the measurement value detected by the measurement unit LD from the measurement unit LD. Then, the measurement control unit 543 acquires the measurement information acquired by the measurement unit control device 70 from the measurement unit control device 70 (step S180).

Next, the robot control unit 545 determines whether or not the measurement value indicated by the measurement information acquired by the measurement control unit 543 in step S180 coincides with the predetermined value (step S190). In a case where it is determined that the measurement value does not coincide with the predetermined value (NO in step S190), the robot control unit 545 determines that the height of the discharge unit D does not coincide with the predetermined height. Then, the robot control unit 545 controls the robot 20 and changes the position in the Z-axis direction of the robot coordinate system RC among the positions of the control point T so that the measurement value and the predetermined value coincide with each other (step S200). Then, the robot control unit 545 determines whether or not the predetermined condition described above is satisfied. In a case where the robot control unit 545 determines that the condition is not satisfied, the measurement control unit 543 transitions to step S180 to control the measurement unit control device 70, causes the measurement unit control device 70 to acquire the measurement information indicating the measurement value detected by the measurement unit LD from the measurement unit LD, and acquires the measurement information acquired by the measurement unit control device 70 from the measurement unit control device 70 again. On the other hand, in a case where it is determined that the condition is satisfied, the robot control unit 545 determines that the predetermined work is ended, and stops the work of the robot 20. In this case, the discharge control unit 541 causes the discharge unit D to stop the discharge of the discharge substance. Then, the robot control unit 545 makes a transition to step S220.

After repetitive processing from step S170 to step S200 is performed, the robot control unit 545 operates the robot 20, moves the control point T so that the second teaching point and the control point T coincide with each other (step S220), and the processing is ended.

As described above, the robot control device 50 operates the robot 20 by the processing of step S160 to step S200 to move the discharge unit D along the predetermined trajectory while maintaining the height of the discharge unit D at a predetermined height and discharge the discharge substance onto the top surface.

Figure 12:
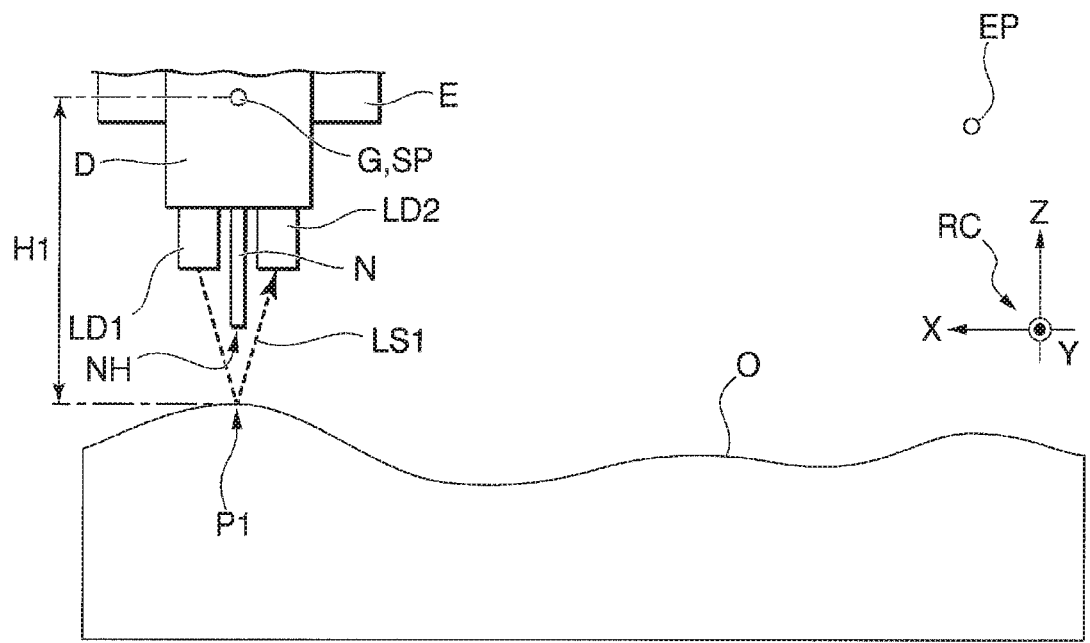
FIG. 12 is a diagram illustrating an example of a positional relationship between a target and the discharge unit at a start timing.
Figure 13:
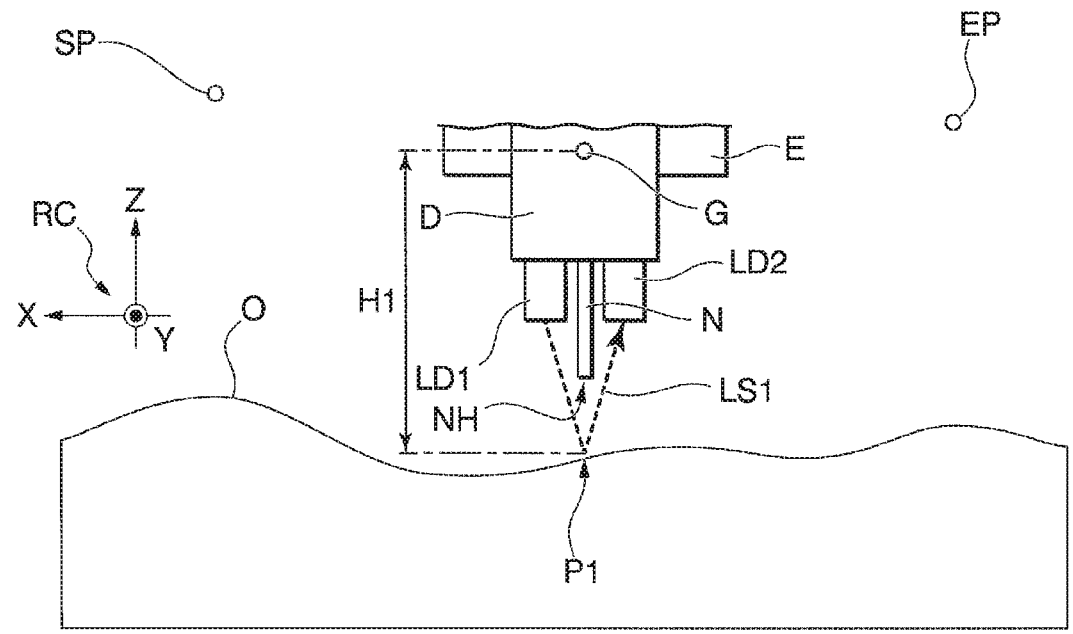
FIG. 13 is a diagram illustrating an example of a positional relationship between the target and the discharge unit at an intermediate timing.
Figure 14:
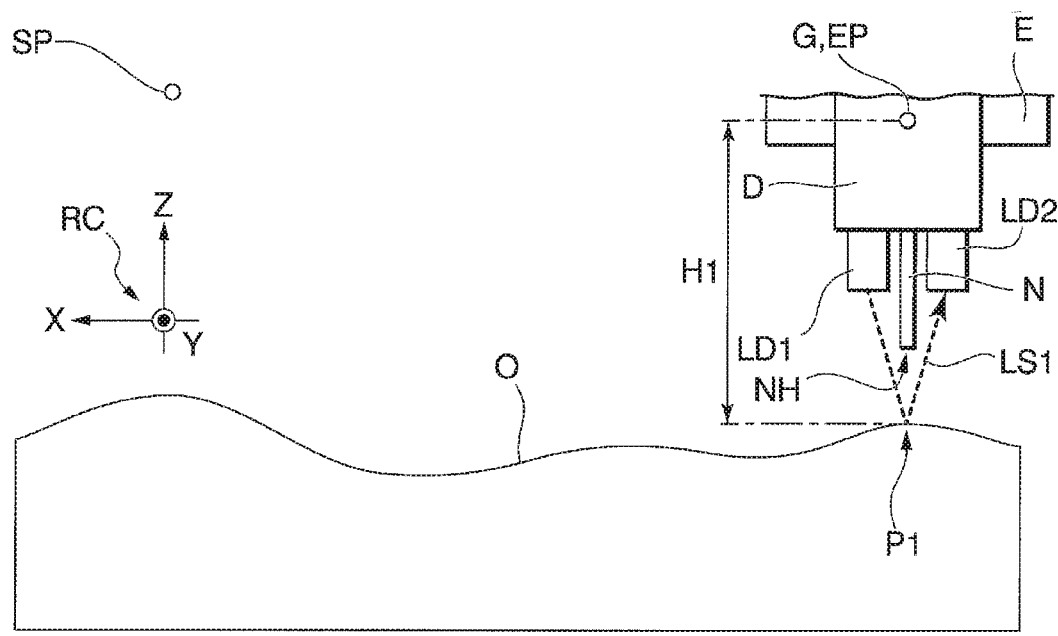
FIG. 14 is a diagram illustrating an example of a positional relationship between the target and the discharge unit at an end timing.

Here, with reference to FIGS. 12 to 14, the operation of the robot 20 controlled by the processing of step S160 to step S200 will be described. FIG. 12 is a diagram illustrating an example of a positional relationship between the target O and the discharge unit D at the start timing. The start timing is the timing at which the robot 20 starts a predetermined work in step S160. FIG. 13 is a diagram illustrating an example of the positional relationship between the target O and the discharge unit D at an intermediate timing. The intermediate timing is the timing between the start timing and the end timing. The end timing is the timing at which the robot 20 ends the predetermined work. FIG. 14 is a diagram illustrating an example of the positional relationship between the target O and the discharge unit D at the end timing. FIGS. 12 to 14 illustrate, as an example, the positional relationship between the target O and discharge unit D in the case where the discharge unit D is moving toward the negative direction side of the X-axis from the positive direction side of the X-axis in the robot coordinate system RC.

A point G illustrated in each of FIGS. 12 to 14 indicates the position of the discharge unit D. A point SP indicates a position with which the position of the discharge unit D coincides at the start timing, that is, a position of a start point in a trajectory representing change in the position of the discharge unit D in the predetermined work. The position of the start point on the XY plane in the robot coordinate system RC is a position coincident with the first plane position. The height of the start point, which is the relative distance between the start point and the upper surface of the target O and which is the distance along the Z-axis in the robot coordinate system RC, is a height which coincides with the predetermined height. A point EP indicates the position with which the position of the discharge unit D coincides at the end timing, that is, a position of the end point in a trajectory representing change in the position of the discharge unit D in the predetermined work. The position of the end point on the XY plane in the robot coordinate system RC is a position which coincides with the second plane position. The height of the end point which is the relative distance between the end point and the upper surface of the target O and which is the distance along the Z-axis in the robot coordinate system RC is the height that coincides with the predetermined height. An arrow LS1 indicates the trajectory of the laser beam until the laser beam emitted from the light-emitting portion LD1 is received by the light-receiving portion LD2. A point P1 indicates the first position irradiated with the laser beam among the positions included in the upper surface of the target O. A height H1 indicates the height of the discharge unit D.

As described in the flowchart illustrated in FIG. 11, by the processing of step S160 to step S200, the robot control device 50 controls (moves) the control point T (that is, movable unit A) so that the measurement value detected by the measurement unit LD is kept constant and changes the position of the discharge unit D from the position indicated by the point SP to the position indicated by the point EP. With this configuration, the robot control device 50 can perform work on the target along a predetermined trajectory while keeping the relative distance between the first position of the target and the tool constant. That is, by this processing, the robot control device 50 moves the control point T along irregularities on the upper surface of the target O to move the discharge unit D along the irregularities. In this case, the robot control device 50 controls the discharge unit D and causes the discharge unit D to discharge the discharge substance, thereby performing a predetermined work. When the discharge unit D is viewed in the negative direction of the Z axis in the robot coordinate system RC while the work is performed, the discharge unit D moves in one straight line along the predetermined trajectory described above.

By the processing of step S160 to step S200, the robot control device 50 moves (controls) the control point T (that is, movable unit A) based on the measurement value detected by the measurement unit LD while the discharge unit D discharges the discharge substance. With this configuration, the robot control device 50 can shorten the time for performing work on the target O along the predetermined trajectory. The robot control device 50 may be configured to control each of the robot 20, the discharge unit D, and the measurement unit LD so that some or all of a time period during which the discharge unit D discharges the discharge substance and a time period during which the control point T (that is, the movable unit A) is being moved (controlled) based on the measurement value detected by the measurement unit LD do not overlap each other.

As described above, the robot control device 50 can cause the robot 20 to accurately perform work of discharging the discharge substance to the target O along the predetermined trajectory by the processing of the flowchart illustrated in FIG. 11.

The robot control device 50 may be configured to change an amount of the discharge substance to be discharged by the discharge unit D according to moving speed of the control point T.

Modification Example 1 of Embodiment

In the following, Modification example 1 of the embodiment will be described. The robot system 1 according to the embodiment described above may be configured to include an imaging unit capable of imaging the upper surface of the target O. In this case, instead of the configuration in which teaching point information is stored in advance in the memory 32, the robot control unit 545 may be configured to detect each of the first plane position and second plane position described above based on a captured image captured by the imaging unit. In the following, as the robot system 1 according to Modification example 1 of the embodiment, the robot system 1 in this case will be described with reference to FIG. 15. In the robot system 1, instead of the teaching point information, plane position information which is information indicating the relative position from the position of the center of gravity of the target O on the XY plane in the robot coordinate system RC to each of the first plane position and the second plane position, is stored in advance in the memory 32 of the robot control device 50.

Figure 15:
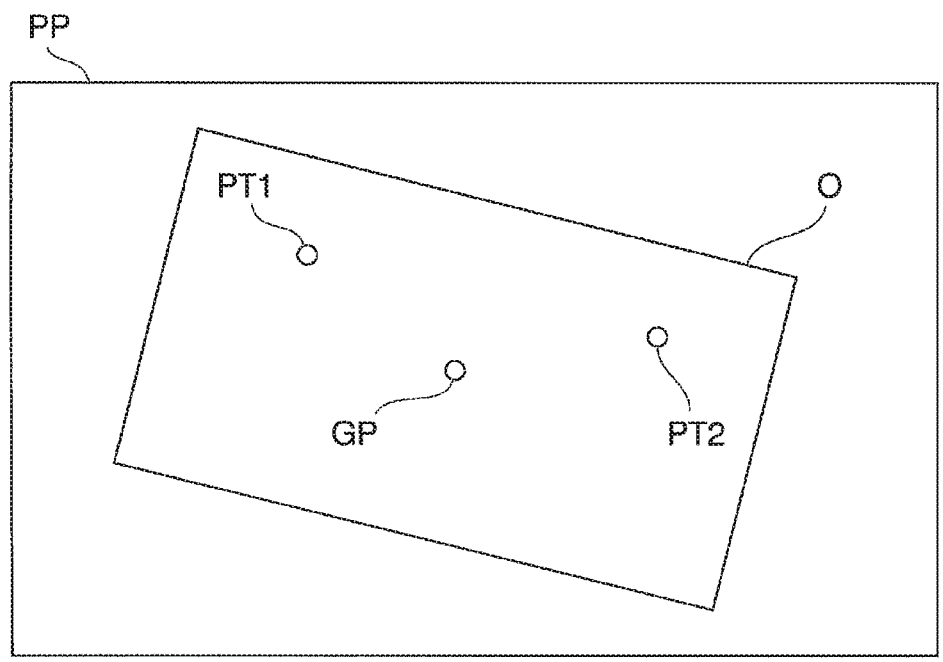
FIG. 15 is a diagram illustrating an example of a captured image obtained by capturing an upper surface of the target by an imaging unit included in a robot system according to Modification example 1 of the embodiment.

FIG. 15 is a diagram illustrating an example of a captured image obtained by capturing the upper surface of the target O by the imaging unit included in the robot system 1 according to Modification example 1 of the embodiment. An image PP illustrated in FIG. 15 illustrates an example of the captured image. The robot control device 50 acquires the captured image, which is captured by the imaging unit, from the imaging unit. In the following, as an example, a description will be made on a case where the robot control device 50 has previously performed a calibration for correlating the position on the captured image with the position on the XY plane in the robot coordinate system RC. The robot control device 50 detects the position of the center of gravity of the target O on the XY plane based on the acquired captured image. A point GP illustrated in FIG. 15 illustrates an example of the position of the center of gravity. The robot control device 50 calculates each of the first plane position on the XY plane and the second plane position on the XY plane, based on the detected position of the center of gravity and the plane position information in advance stored in the memory 32. Here, a point PT 1 illustrated in FIG. 15 illustrates an example of the first plane position on the captured image. A point PT 2 illustrated in FIG. 15 illustrates an example of the second plane position on the captured image.

The robot control device 50 can perform the processing of step S130 to step S220 based on the calculated first plane position and second plane position and information indicating each of the first height position and the second height position which is information stored in advance in the memory 32 to cause the robot 20 to perform work of discharging the discharge substance to the target O along the predetermined trajectory.

The robot control device 50 according to Modification example 1 of the embodiment may be configured to store teaching point information in advance together with the plane position information. For example, in the robot control device 50, teaching point information indicating each of the first teaching point and the second teaching point designated by simulation by the user through the information processing terminal 30 may be stored in advance by the information processing terminal 30, in some cases. In such a case, each of the first plane position among the positions of the first teaching point and the second plane position among the positions of the second teaching point may deviate from the first plane position and the second plane position that the user desires to designate in the real world. In this case, the robot control device 50 corrects each of the first teaching point and the second teaching point indicated by the teaching point information stored in the memory 32 in advance, based on the captured image captured by the imaging unit included in the robot system 1 in Modification example 1. That is, the robot control device 50 corrects the first plane position among the positions of the first teaching point and corrects the second plane position among the positions of the second teaching point. With this configuration, the robot control device 50 can make the predetermined trajectory coincident with the trajectory on which the discharge unit D moves with high accuracy, and as a result, accuracy of the work performed by the robot 20 on the target O along the predetermined trajectory can be further improved.

Modification Example 2 of Embodiment

Figure 16:
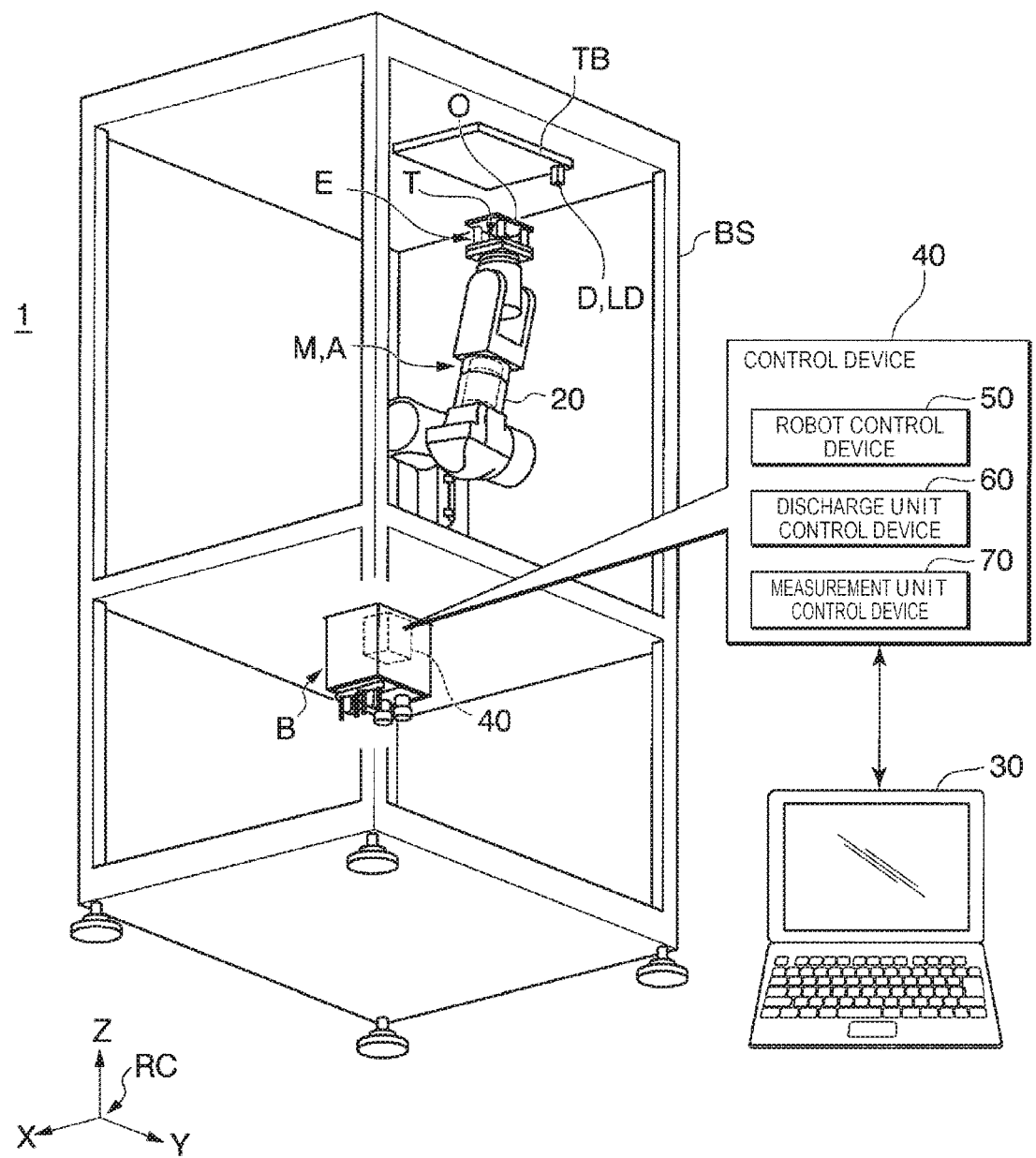
FIG. 16 is a diagram illustrating an example of a configuration of a robot system according to Modification example 2 of the embodiment.

In the following, Modification Example 2 of the embodiment will be described with reference to FIG. 16. FIG. 16 is a diagram illustrating an example of a configuration of the robot system 1 according to Modification Example 2 of the embodiment. In Modification example 2, the robot 20 and the work stand TB are provided on the rack BS so that the upper-and-lower relationship between the work stand TB and the robot 20 is reversed. In Modification example 2, the discharge unit D provided with the measurement unit LD is not provided in the end effector E, but is fixed to the work stand TB so as not to be moved. In this case, the discharge unit D is fixed to the upper surface of the work stand TB so that the discharge direction coincides with, for example, the negative direction of the Z-axis in the robot coordinate system RC. The discharge unit D may be configured to be fixed to the upper surface so that the discharge direction coincides with a direction different from the positive direction. As illustrated in FIG. 16, in this example, the robot 20 holds the target O by the end effector E such that the upper surface of the target O faces upward. That is, in Modification example 2 of the embodiment, the robot control device 50 moves the target O instead of the discharge unit D to perform work of discharging the discharge substance to the target O along the predetermined trajectory.

When the robot control device 50 causes the robot 20 to perform work of discharging the discharge substance onto the target O along the predetermined trajectory, the robot control device 50 sets the external control point, which is an imaginary point which does not move together with the position of the discharge unit D, as the position of the discharge unit D. Based on the relative positional relationship between the set external control point and the control point T, that is, the relative positional relationship between the discharge unit D and the control point T, the robot control device 50 operates the robot 20 so as to realize the relative positional relationship between the first teaching point, the discharge unit D, the first position, and the second teaching point illustrated in FIGS. 12 to 14, thereby causing the robot 20 to perform the work. In this case, the robot control device 50 may operate the robot 20 so that speed of the discharge port NH becomes constant with respect to the external control point, and may operate the robot 20 so that the speed is changed with respect to the external control point.

The robot system 1 according to each of the embodiment, Modification Example 1 of the embodiment, and the Modification Example 2 of the embodiment described above may be configured to include a tool such as an electric screwdriver for performing work on the target O, instead of the discharge unit D. With this configuration, the robot system 1 can cause the robot to accurately perform work, which is to be performed on the target by the tool along the trajectory, among pieces of work to be performed on the target along the predetermined trajectory. The tool may be a processing unit such as a grinder for processing the target O. In this case, the robot system 1 can cause the robot to accurately perform work of processing the target by the processing unit along the trajectory among pieces of work to be performed on the target along the predetermined trajectory.

The manipulator M described above may be configured so that the third arm L3 and the fourth arm L4 can overlap with each other when viewed from the axial direction of the third pivot axis AX3. The manipulator M may be configured so that the fifth arm L5 and the sixth arm L6 can overlap with each other when viewed from the axial direction of the fifth pivot axis AX5.

In a case where the robot control device 50, the discharge unit control device 60, and the measurement unit control device 70 described above constitute the control device 40 as a single unit, the control device 40 includes a single processor (for example, the processor 51 described above), a single memory (for example, the memory 52 described above), and a single communication unit (for example, the communication unit 53 described above). The robot control device 50 may be configured to be controlled by a processor included in at least one of the discharge unit control device 60 and the measurement unit control device 70, or may be configured to be controlled by a processor included in another information processing device connected to the robot control device 50 via a network.

As described above, the control device 40 is a control device which includes a control unit (in this example, the control unit 54) controlling a movable unit (in this example, the movable unit A) included in a robot (in this example, the robot 20) so as to perform work on a target using a tool that performs work on a target (in this example, the target O) and a measurement unit (in this example, the measurement unit LD) that measures a measurement value according to a relative distance between the first position of the target and the tool, and in which the first position includes a portion overlapping the tool when viewed from a direction toward the target from the tool.

With this configuration, the control device 40 can cause the robot to accurately perform work to be performed on the target along the predetermined trajectory.

The control device unit 40 controls the movable unit based on the measurement value while work is being performed by the tool. With this configuration, the control device 40 can shorten the time for performing work on the target along the predetermined trajectory.

The control device 40 controls the movable unit so that the measurement value is kept constant. With this configuration, the control device 40 can work on the target along a predetermined trajectory while keeping the relative distance between the first position of the target and the tool constant.

The control device 40 corrects the teaching point indicated by teaching point information stored in advance based on the image from the imaging unit capable of imaging the target and controls the movable unit based on the corrected teaching point. With this configuration, the control device 40 can make the predetermined trajectory coincident with the trajectory on which the tool moves with high accuracy, and as a result, accuracy of work to be performed by the robot on the target along the predetermined trajectory can be further improved.

The control device 40 controls the movable unit provided with the measurement unit and the tool. With this configuration, the control device 40 can cause the robot to perform work to be performed on the target along the predetermined trajectory with high accuracy by using the measurement unit and the tool that move together with the movable unit.

The control device 40 controls the movable unit based on the external control point positioned at a position different from the movable unit that holds the target by the holding portion (end effector E in this example). With this configuration, the control device moves the target with respect to the measurement unit and the tool, which are fixed so as not to move, by the movable unit to thereby cause the robot to perform work to be performed on the target along the predetermined trajectory with high accuracy.

Although the embodiment of the invention has been described in detail with reference to the drawings, a specific configuration is not limited to the embodiment, and various modifications, substitutions, deletions or the like may be made without departing from the gist of the invention or the like.

Further, a program for realizing the functions of any constituent unit in the devices (for example, the robot control device 50, the discharge unit control device 60, the measurement unit control device 70) described above may be recorded on a computer readable recording medium and this program may be read into the computer system to be executed. The "computer system" referred to here includes an operating system (OS) and hardware such as peripheral devices. The "computer readable recording medium" refers to a storage device such as, a portable medium such as a flexible disk, a magneto-optical disk, a ROM, and a compact disk (CD)-ROM, and a hard disk built in a computer system. Furthermore, the "computer readable recording medium" refers to a medium that stores a program for a certain period of time, such as a volatile memory (RAM) inside a computer system serving as a server or a client in a case where a program is transmitted via a network such as the Internet or a communication line such as a telephone line.

The above program described above may be transmitted from a computer system in which the program is stored in a storage device or the like to another computer system via a transmission medium or by a transmission wave in the transmission medium. Here, the "transmission medium" for transmitting a program refers to a medium having a function of transmitting information such as a network (communication network) such as the Internet and a communication channel (communication line) such as a telephone line.

The program described above may be for realizing some of the functions described above. Furthermore, the program described above may be a so-called difference file (difference program) which can realize the functions described above in combination with a program already recorded in the computer system.

The entire disclosure of Japanese Patent Application No. 2017-210830, filed Oct. 31, 2017 is expressly incorporated by reference herein.

What is claimed is:

1. A control device comprising:
   a memory configured to store computer-executable instructions; and
   a processor that is configured to execute the computer-executable instructions so as to control an arm included in a robot,
   wherein a tool is attached on the arm, the tool has a nozzle, a light emitter, and a light receiver, and the nozzle is sandwiched between the light emitter and the light receiver when viewed along a first direction in a Z-axis,
   the tool has a bottom surface in a first XY plane extending along an X-axis and a Y-axis orthogonal to each other, each of the X axis and the Y axis being orthogonal to the Z-axis, the nozzle projects from the bottom surface and has a first length along the first direction, the light emitter projects from the bottom surface and has a second length along the first direction, and the light receiver projects from the bottom surface and has a third length along the first direction,
   the nozzle is configured to discharge a substance on a discharge position on a target along the first direction, the discharged substance having a first radius, a discharge port of the nozzle having a second radius,
the light emitter is configured to emit a light to a first position on the target, and the light receiver is configured to receive a reflected light from the first position,
wherein the processor is further configured to:
cause the light emitter to emit the light to the first position on the target;
cause the light receiver to receive the reflected light from the first position;
measure a measurement value according to a relative distance between the tool and the first position on the target based on the received reflected light; and
cause the nozzle to discharge the substance on the discharge position on the target using the measurement value while the processor is configured to move the arm along a predetermined trajectory on a second XY plane extending along the X-axis and the Y-axis,
the discharge position and the first position are spaced apart from each other on the target for a first distance, and the first distance is equal to or more than a sum of the first radius and the second radius,
wherein the first position and the discharge position are overlapped with the tool when viewed along the first direction, and
the second length and the third length are substantially the same, and the first length is longer than each of the second length and the third length.

2. The control device according to claim 1,
wherein the first position is not overlapped with the nozzle when viewed along the first direction.

3. The control device according to claim 1,
wherein the processor is configured to control the arm while the processor maintains the measurement value so that the relative distance is kept constant.

4. The control device according to claim 1,
wherein the processor is configured to correct a teaching point indicated by teaching point information stored in the memory in advance based on an image from a camera that images the target, and
the processor is configured to control the arm based on the corrected teaching point.

5. The control device according to claim 1,
wherein an end effector provided in the arm holds the target, and
the processor is configured to control the arm based on an external control point positioned at a position different from the arm.

6. The control device according to claim 1,
wherein the processor is further configured to:
determine whether a second distance between the first position and the tool is a predetermined value based on the measurement value; and
move the arm to maintain the predetermined value when the second distance and the predetermined value are different.

7. A robot comprising:
an arm;
a tool attached on the arm, the tool having a nozzle, a light emitter, and a light receiver, the nozzle being sandwiched between the light emitter and the light receiver when viewed along a first direction in a Z-axis;
a memory configured to store computer-executable instructions; and
a processor that is configured to execute the computer-executable instructions so as to control the arm,
wherein the tool has a bottom surface in a first XY plane extending along an X-axis and a Y-axis orthogonal to each other, each of the X axis and the Y axis being orthogonal to the Z-axis, the nozzle projects from the bottom surface and has a first length along the first direction, the light emitter projects from the bottom surface and has a second length along the first direction, and the light receiver projects from the bottom surface and has a third length along the first direction,
wherein the nozzle is configured to discharge a substance on a discharge position on a target along the first direction, the discharged substance having a first radius, a discharge port of the nozzle having a second radius,
the light emitter is configured to emit a light to a first position on the target, and the light receiver is configured to receive a reflected light from the first position,
wherein the processor is further configured to:
cause the light emitter to emit the light to the first position on the target;
cause the light receiver to receive the reflected light from the first position;
measure a measurement value according to a relative distance between the tool and the first position on the target based on the received reflected light; and
cause the nozzle to discharge the substance on the discharge position on the target using the measurement value while the processor is configured to move the arm along a predetermined trajectory on a second XY plane extending along the X-axis and the Y-axis,
the discharge position and the first position are spaced apart from each other on the target for a first distance, and the first distance is equal to or more than a sum of the first radius and the second radius,
wherein the first position and the discharge position are overlapped with the tool when viewed along the first direction, and
the second length and the third length are substantially the same, and the first length is longer than each of the second length and the third length.

8. The robot according to claim 7,
wherein the first position is not overlapped with the nozzle when viewed along the first direction.

9. The robot according to claim 7,
wherein the processor is further configured to:
determine whether a second distance between the first position and the tool is a predetermined value based on the measurement value; and
move the arm to maintain the predetermined value when the second distance and the predetermined value are different.

10. A robot system comprising:
a robot that includes an arm;
a tool is attached on the arm, the tool having a nozzle, a light emitter, and a light receiver, the nozzle being sandwiched between the light emitter and the light receiver when viewed along a first direction in a Z-axis; and
a control device that includes:
a memory configured to store computer-executable instructions; and
a processor configured to execute the computer-executable instructions so as to control the arm,
wherein the tool has a bottom surface in a first XY plane extending along an X-axis and a Y-axis orthogonal to each other, each of the X axis and the Y axis being orthogonal to the Z-axis, the nozzle projects from the bottom surface and has a first length along the first direction, the light emitter projects from the bottom surface and has a second length along the first direction, and the light receiver projects from the bottom surface and has a third length along the first direction, wherein the nozzle is configured to discharge a substance on a discharge position on a target along the first direction, the discharged substance having a first radius, a discharge port of the nozzle having a second radius, the light emitter is configured to emit a light to a first position on the target, and the light receiver is configured to receive a reflected light from the first position, wherein the processor is further configured to:
cause the light emitter to emit the light to the first position on the target;
cause the light receiver to receive the reflected light from the first position;
measure a measurement value according to a relative distance between the tool and the first position on the target based on the received reflected light; and
cause the nozzle to discharge the substance on the discharge position on the target using the measurement value while the processor is configured to move the arm along a predetermined trajectory on a second XY plane extending along the X-axis and the Y-axis, the discharge position and the first position are spaced apart from each other on the target for a first distance, and the first distance is equal to or more than a sum of the first radius and the second radius, wherein the first position and the discharge position are overlapped with the tool when viewed along the first direction, and the second length and the third length are substantially the same, and the first length is longer than each of the second length and the third length.

11. The robot system according to claim 10, wherein the first position is not overlapped with the nozzle when viewed along the first direction.

12. The robot system according to claim 10, wherein the processor is further configured to:
determine whether a second distance between the first position and the tool is a predetermined value based on the measurement value; and
move the arm to maintain the predetermined value when the second distance and the predetermined value are different.

* * * * *